US010789253B2

(12) United States Patent
Fujimoto et al.

(10) Patent No.: US 10,789,253 B2
(45) Date of Patent: Sep. 29, 2020

(54) COMPUTING SYSTEM AND SERVER

(71) Applicant: Hitachi, Ltd., Chiyoda-ku, Tokyo (JP)

(72) Inventors: Kazuhisa Fujimoto, Tokyo (JP); Shinji Fujiwara, Tokyo (JP); Satoru Watanabe, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 195 days.

(21) Appl. No.: 16/081,023

(22) PCT Filed: Apr. 27, 2016

(86) PCT No.: PCT/JP2016/063299
§ 371 (c)(1),
(2) Date: Aug. 29, 2018

(87) PCT Pub. No.: WO2017/187582
PCT Pub. Date: Nov. 2, 2017

(65) Prior Publication Data
US 2019/0324969 A1 Oct. 24, 2019

(51) Int. Cl.
*G06F 16/245* (2019.01)
*G06F 3/06* (2006.01)
*G06F 9/38* (2018.01)
(52) U.S. Cl.
CPC ...... *G06F 16/24569* (2019.01); *G06F 3/0604* (2013.01); *G06F 3/064* (2013.01);
(Continued)
(58) Field of Classification Search
USPC ....................................................... 707/769
See application file for complete search history.

(56) References Cited

U.S. PATENT DOCUMENTS 7,697,312 B2 * 4/2010 Tanaka ................. G06F 3/0614
365/63
8,868,865 B1 * 10/2014 Kondoh ................ G06F 13/28
711/100
(Continued)

FOREIGN PATENT DOCUMENTS

JP   2006-011932 A   1/2006
JP   2010-272066 A   12/2010
(Continued)

OTHER PUBLICATIONS

Si, M. et al. "Design of Communication Facility on Many-Core based Cluster", IPSJ SIG Technical Report, Mar. 26, 2012; No. 16, vol. 2012-HPC-133.

*Primary Examiner* — Hicham Skhoun
(74) *Attorney, Agent, or Firm* — Procopio, Cory, Hargreaves & Savitch LLP

(57) ABSTRACT

A storage device, connected to a computer including a processor and first memory, and executing a program, stores data processed under the program. The computer includes a protocol processing unit that accesses data in the storage device, an accelerator that includes an arithmetic unit executing a part of a process of the program, and a second memory storing data, and executes the part of the process. The first memory receives a processing request for processing data, and causes the accelerator to execute a command to process data, corresponding to the processing request for the processing request including a process to be executed by the arithmetic unit. The accelerator requests the protocol processing unit to provide target data indicated by a command received from the program, reads data from the storage device via the protocol processing unit, and stores the data in the second memory. The arithmetic unit executes the command.

16 Claims, 16 Drawing Sheets

(52) U.S. Cl.
CPC ............ G06F 3/067 (2013.01); G06F 3/0659 (2013.01); G06F 9/3877 (2013.01)

(56) References Cited

U.S. PATENT DOCUMENTS

| | | | |
|---|---|---|---|
| 8,959,094 B2 | 2/2015 | Taylor | |
| 2007/0127525 A1* | 6/2007 | Sarangam | H04L 69/169 370/469 |
| 2007/0271401 A1* | 11/2007 | Louzoun | G06F 13/26 710/264 |
| 2010/0077106 A1* | 3/2010 | Komikado | G06F 3/061 710/5 |
| 2011/0295862 A1* | 12/2011 | Taylor | G06F 7/24 707/752 |
| 2013/0268694 A1* | 10/2013 | Campbell | G06F 13/385 710/8 |
| 2013/0332640 A1 | 12/2013 | Nasu | |
| 2014/0351360 A1* | 11/2014 | Kondoh | G06F 15/17331 709/212 |
| 2015/0370492 A1* | 12/2015 | Satnur | G06F 3/061 711/114 |
| 2017/0068686 A1* | 3/2017 | Broido | G06F 16/188 |

FOREIGN PATENT DOCUMENTS

| | | |
|---|---|---|
| JP | 2013-254405 A | 12/2013 |
| JP | 2014-222426 A | 11/2014 |

\* cited by examiner

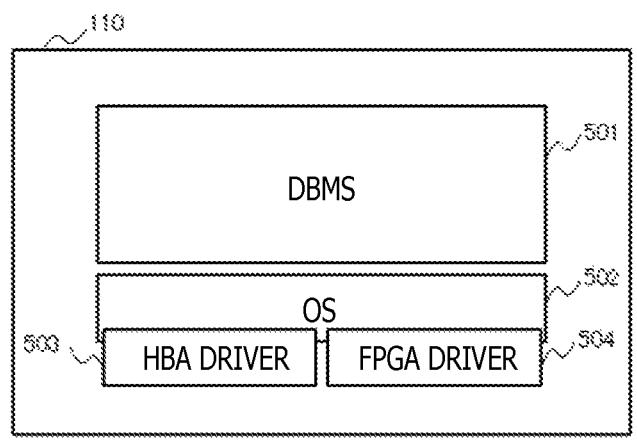

FIG.19

180 DEVICE TABLE

| LU# | Protocol | Table |
|---|---|---|
| 0 | SCSI | A |
| 1 | NVMe | B |
| 2 | SCSI | C |
| 3 | NVMe | D |

FIG.20

460 PROTOCOL TABLE

| LU# | Protocol |
|---|---|
| 0 | SCSI |
| 1 | NVMe |
| 2 | SCSI |
| 3 | NVMe |

COMPUTING SYSTEM AND SERVER

CROSS-REFERENCE TO RELATED APPLICATIONS

This application is a U.S. National Stage entry of PCT Application No. PCT/JP2016/063299 filed Apr. 27, 2016, the contents of which are incorporated herein by reference.

TECHNICAL FIELD

The present invention relates to a computer which processes an input/output (I/O) command.

BACKGROUND ART

Big data analysis has been widespread at business sites, producing ever-increasing data volumes of analysis targets. In the analysis of commodity sales data (data indicating point of sale (POS)), for example, data volumes increase with globalization of business, and form diversification of selling such as online stores as well as physical stores. Database tables of analysis targets are each estimated to have a volume of terra byte (TB) or larger order in the future.

Analysis at a high speed and achievement of a result in a short period are demanded to utilize a result of big data analysis immediately at business sites. However, with current limitation to refinement of semiconductor processing, performance improvement of a central processing unit (CPU) which executes analysis is estimated to slow down.

For providing a means capable of compensating for performance of a CPU, such research or development has been widely conducted which off-loads a part of processes of middleware or applications to an accelerator such as a co-processor, and causes the accelerator to perform the part of processes as hardware to improve performance of a system (e.g., Patent Document 1).

Patent Document 1 describes an information processing device which off-loads analysis of data to a node including a local memory and a co-processor, and causes the co-processor and the memory to directly communicate with each other without intervention of a host processor therebetween to increase a processing speed.

PRIOR ART DOCUMENT

Patent Document

Patent Document 1: U.S. Pat. No. 8,959,094

SUMMARY OF THE INVENTION

Problem to be Solved by the Invention

According to the conventional example described above, however, the co-processor functioning as an accelerator is configured to read data from the paired local memory within the same node. In this case, the capacity of the local memory within the node runs short after completion of analysis of big data. Data is therefore needs to be stored in an external storage system.

Accordingly, the node including the co-processor is required to read data from the storage system, and store the data in the memory. In this case, a host processor connected to the node reads data from the storage system into a main memory, and then transfers the data to the memory within the node. The co-processor at a start of processing is therefore kept waiting before completion of writing to the main memory and transfer from the main memory to the local memory.

This condition increases latency produced by writing and reading between the host processor and the main memory in case of analysis of big data. It is therefore difficult to sufficiently utilize performance of an accelerator according to the conventional example described above.

The present invention has been developed in consideration of the aforementioned problems. It is an object of the present invention to provide a technology which processes a large volume of data at a high speed.

Means for Solving the Problem

An example of the present invention is directed to a computing system including: a computer that includes a processor and a first memory, and executes a data processing program; and a storage device that is connected to the computer via a network, and stores data processed under the data processing program. The computer includes: a protocol processing unit that is connected to the network, and accesses data stored in the storage device; and an accelerator that includes an arithmetic unit connected to the processor and executing a part of a process of the data processing program, and a second memory storing data, and executes the part of the process of the data processing program. The first memory stores a data processing program that receives a processing request for processing the data, and causes the accelerator to execute a data processing command corresponding to the processing request in case of the processing request including a process to be executed by the arithmetic unit, or issues, to the protocol processing unit, a data processing command corresponding to the processing request in case of the processing request not including a process to be executed by the arithmetic unit. The accelerator requests the protocol processing unit to provide target data indicated by a data processing command received from the data processing program, reads the data corresponding to the data processing program from the storage device via the protocol processing unit, and stores the data in the second memory. Subsequently, the arithmetic unit that executes the part of the process executes the data processing command.

Effect of the Invention

According to the present invention, a large volume of data is allowed to be processed at a high speed by off-loading a predetermined process for data stored in a storage device to an accelerator, and causing the accelerator to read the data from the storage device and then execute processing.

BRIEF DESCRIPTION OF THE DRAWINGS

FIG. 4 is a block diagram illustrating the first embodiment of the present invention, showing an example of software loaded to a main memory of a server.

FIG. 5 is a diagram illustrating the first embodiment of the present invention, showing an example of a device allocation table.

FIG. 6 is a diagram illustrating the first embodiment of the present invention, showing an example of an LU management table.

FIG. 19 is a diagram illustrating the fifth embodiment of the present invention, showing an example of a device table.

FIG. 20 is a diagram illustrating the fifth embodiment of the present invention, showing an example of a protocol table.

MODES FOR CARRYING OUT THE INVENTION

Embodiments according to the present invention are hereinafter described with reference to the appended drawings.

First Embodiment

Figure 1:
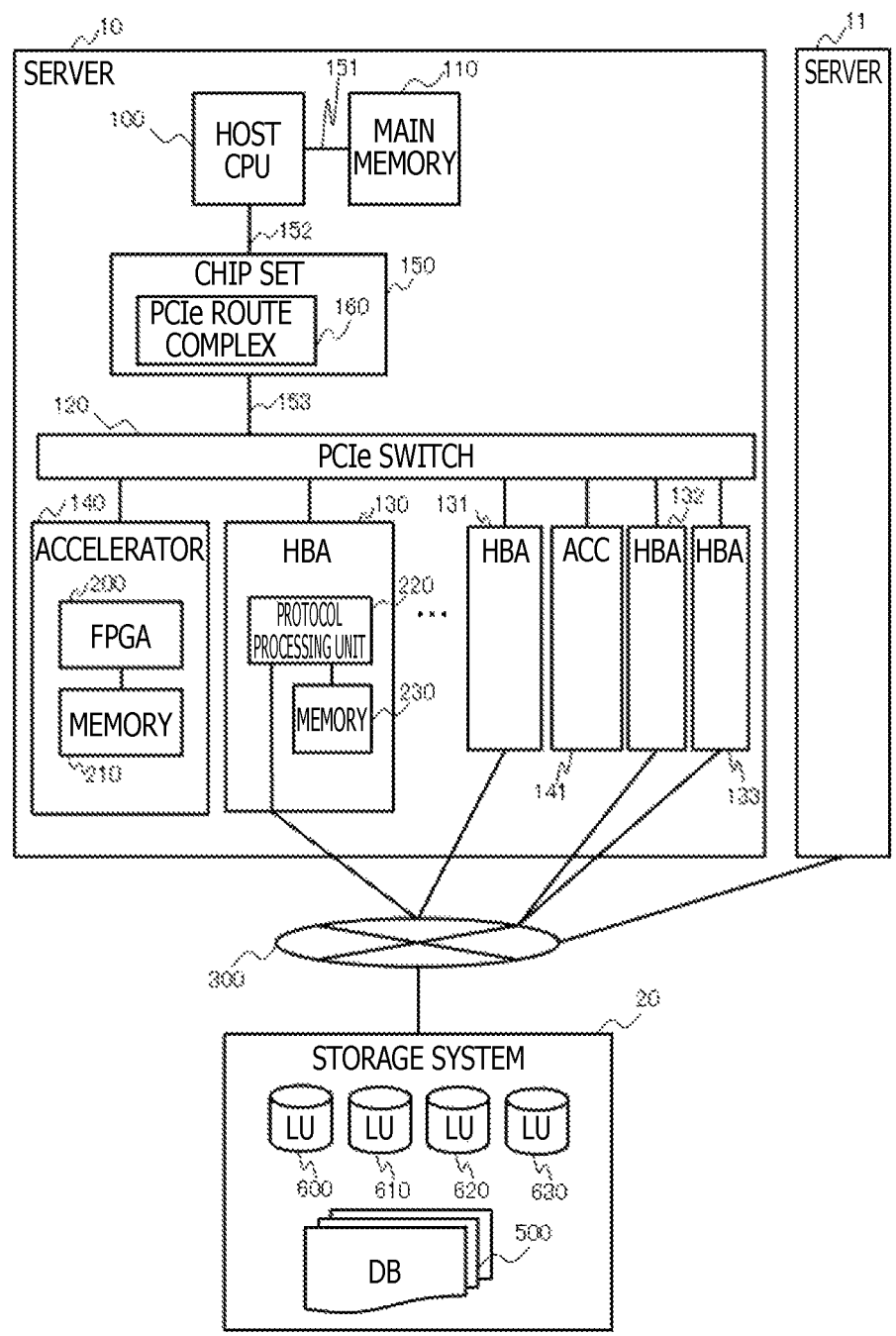
FIG. 1 is a block diagram illustrating a first embodiment of the present invention, showing an example of a computing system.

FIG. 1 is a block diagram illustrating an example of a computing system to which the present invention has been applied. The computing system executes a data processing program. In the computing system, servers 10 and 11 each of which manages databases, and a storage system 20 which stores databases 500 as data processed under the data processing program are connected to each other via a storage area network (SAN) 300.

The server 10 is equipped with accelerators 140 and 141 to each of which a part of database processing (e.g., searching process (filtering) and aggregating process) is assumed to be off-loaded, so as to process the databases 500 stored in the storage system 20.

The server 10 includes a host CPU 100, a main memory 110, a chip set 150, and peripheral component interconnect (PCI)-express (PCIe) switch 120. The host CPU 100 and the main memory 110 are connected via a memory bus 151, while the host CPU 100 and the chip set 150 are connected via an internal bus 152.

A PCIe route complex 160 functions in the chip set 150, and is connected to the PCIe switch 120 via a PCIe bus 153. The accelerators 140 and 141, and host bus adaptors (HBAs) 130, 131, 132, and 133 are connected to the PCIe switch 120. The HBAs 130, 131, 132, and 133 each access the storage system 20 via the SAN 300.

In case of the host CPU 100 incorporating the PCIe route complex 160, a PCIe bus (not shown) is directly connected from the host CPU 100 to the PCIe switch 120.

When the numbers of the accelerators and the HBAs are small, the accelerators and the HBAs may be directly connected to the host CPU 100 via the PCIe bus without using the PCIe switch 120.

The accelerator 141 has a configuration similar to the configuration of the accelerator 140, and therefore is not repeatedly explained herein. Each of the HBAs 131, 132, and 133 has a configuration similar to the configuration of the HBA 130, and therefore is not repeatedly explained herein.

The accelerator 140 is equipped with a field programmable gate array (FPGA) 200, and a memory (second memory) 210 to process data read into the memory 210 by using the FPGA 200. The FPGA 200 functions as a database arithmetic unit. Each of the accelerators 140 and 141 is a device communicative based on non-volatile memory express (NVMe) protocol. Each arithmetic element of the accelerators 140 and 141 is not limited to an FPGA, but may be a graphics processing unit (GPU) or a sub-processor, for example.

The HBA 130 is an I/O device which includes a protocol processing unit 220 and a memory 230, and accesses the storage system 20 via the SAN 300 constituted by a fiber channel. The HBA 130 is an I/O device communicative based on small computer system interface (SCSI) protocol.

The host CPU 100, the accelerator 140, and the HBA 130 are mapped in a memory space of the host CPU 100. The host CPU 100 is mutually communicative with respective I/O devices based on addresses on this memory mapping.

The server 11 is connected to the server 10 described above via a not-shown network, and functions as a backup system of the server 10, for example. The server 11 has a configuration similar to the configuration of the server 10, and therefore is not repeatedly explained herein.

The storage system 20 is a storage device which includes a plurality of logical units (hereinafter each abbreviated as LU) 600, 610, 620, and 630. Each of the LUs 600 to 620 stores one or a plurality of the databases 500. The storage system 20 is accessible from the plurality of servers 10 and 11 on a block basis (in units of block) via the SAN 300.

<Configuration of Accelerator>

Figure 2:
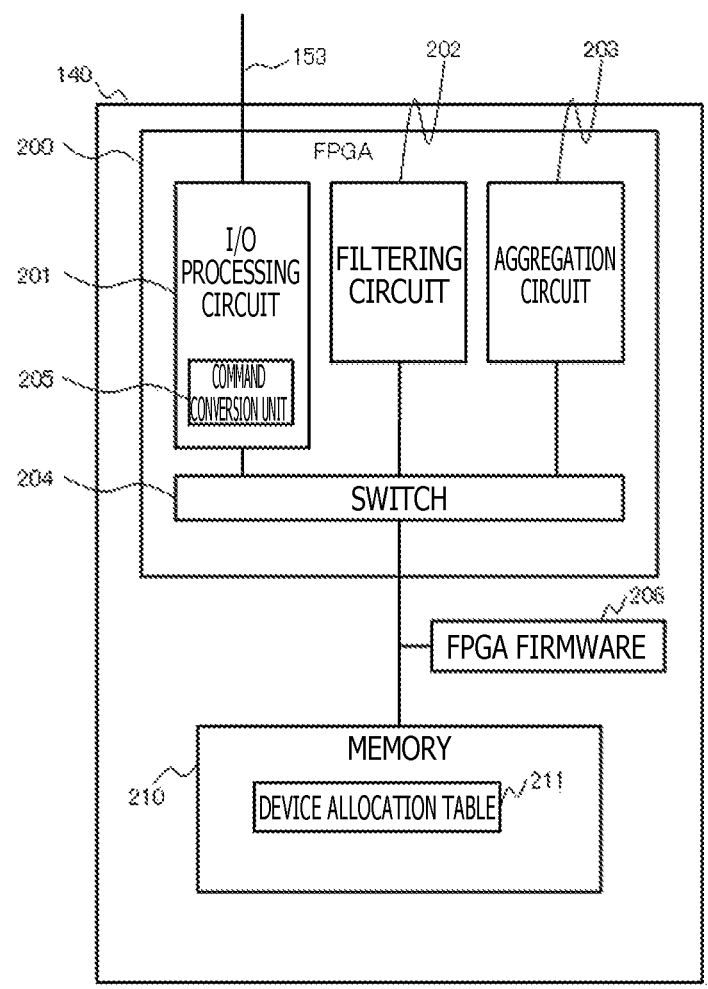
FIG. 2 is a block diagram illustrating the first embodiment of the present invention, showing an example of an accelerator.

FIG. 2 is a block diagram illustrating details of the accelerator 140. The accelerator 140 includes an FPGA firmware 206 in addition to the FPGA 200 and the memory 210.

The FPGA 200 of the accelerator 140 includes an I/O processing circuit 201 which receives an access from the host CPU 100 and requests the HBAs 130 and 131 to provide data, a filtering circuit 202 capable of executing a filtering process at a high speed, an aggregation circuit 203 capable of executing a predetermined aggregating process, and a switch 204 connecting the memory 210 and respective circuits.

The I/O processing circuit 201, the filtering circuit 202, and the aggregation circuit 203 may be mounted as hardware of the FPGA 200. Alternatively, a part or all of functions of the I/O processing circuit 201, the filtering circuit 202, and the aggregation circuit 203 may be mounted as an embedded processor inside the FPGA 200.

The I/O processing circuit 201 has a function of receiving an access from the host CPU 100, and a function of issuing I/O to the HBAs 130 and 131 (more specifically, PCIe end point function and control function for PCIe end point). The I/O processing circuit 201 further includes a command conversion unit 205 which converts a command received from the server 10 (e.g., NVMe command) into a command receivable by the HBAs 130 and 131 (e.g., SCSI command).

The host CPU 100 of the server 10 issues a search command to the FPGA 200 to instruct execution of a filtering process. The I/O processing circuit 201 of the FPGA 200 having received the search command issues a read command to the HBAs 130 and 131 to read data from a block (LBA) designated by the search command, requests data from the database 500 corresponding to a filtering process target, and stores the data in the memory 210 of the accelerator 140.

After completion of the read command issued from the I/O processing circuit 201, the filtering circuit 202 executes a filtering process described in the search command to filter data as processing target stored in the memory 210, and stores the filtered data in the memory 210.

The filtering process is a process for comparing the target database 500 with a conditional expression, and extracting only the database 500 meeting the conditional expression. Particularly when the conditional expression is complicated, or when a data volume of the target database 500 is large, a heavy load is imposed on the host CPU 100 of the server 10. Accordingly, it is effective to off-load the filtering process to the accelerator 140.

Subsequently, the aggregation circuit 203 performs an aggregating process described in the search command to aggregate a search result obtained by the filtering circuit 202, stores an aggregated result in the memory 210, and then notifies the I/O processing circuit 201. The I/O processing circuit 201 reads a processing result of the search command from the memory 210, and writes the processing result in the main memory 110 of the server 10.

The aggregating process herein obtains a sum, average, maximum, minimum, or number of items of data, for example. The aggregation circuit 203 performs the aggregating process described in a search command to aggregate a search result obtained by the filtering circuit 202.

Data retained in the processing target database 500 and read by the HBAs 130 and 131 is written to the memory 210. In addition, information concerning the respective HBAs 130 and 131 used by the accelerator 140 is written to the memory 210 as a device allocation table 211.

FIG. 5 is a diagram showing an example of the device allocation table 211. The device allocation table 211 is created by the server 10 beforehand, and set for the accelerator 140.

The device allocation table 211 has columns 2110 provided in correspondence with the number of accelerators included in the server 10, and rows 2111 provided in correspondence with the number of HBAs 130. Allocation information "1" or "0" is set for each identifier of the accelerators and for each identifier of the HBAs. In this case, "1" indicates an HBA allocated to an accelerator, while "0" indicates a state of no allocation.

The FPGA 200 of the accelerator 140 can determine one of the HBAs 130 to 133 as an access request target with reference to the device allocation table 211.

<Configuration of HBA>

Figure 3:
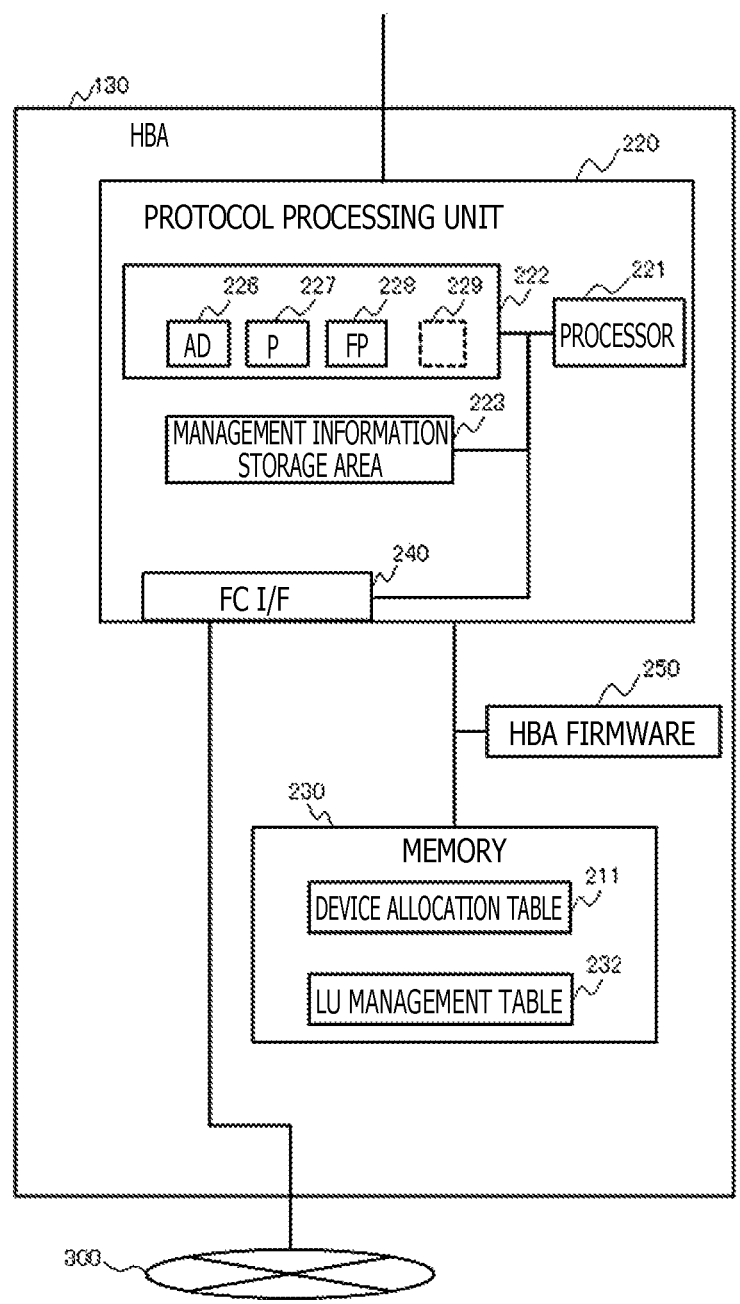
FIG. 3 is a block diagram illustrating the first embodiment of the present invention, showing an example of an HBA.

FIG. 3 is a block diagram illustrating details of the HBA 130. The HBA 130 includes the protocol processing unit 220 which receives an access request from the server 10 or the accelerator 140, and issues an access command to the storage system 20, the memory 230 which stores data read from the storage system 20 via the SAN 300, and an HBA firmware 250 which stores software executed by the protocol processing unit 220.

The protocol processing unit 220 receives an I/O command of SCSI from an outside of the HBA 130, and performs following processing in accordance with the command.

In case of a read command, data at a corresponding read address is read from the corresponding one of the LUs 600 to 630 of the storage system 20, and written to a request destination address of the read data. In case of a write command, write data is read from a transmission source address or the write data, and written to corresponding one of the LUs 600 to 630 of the storage system 20 in accordance with the write address. Described in the first embodiment is an example in which the HBA 130 uses a logical block address (LBA) of the storage system 20 as an address.

The protocol processing unit 220 includes a processor 221 which performs arithmetic processing, a command interface 222 which includes a plurality of queues, a management information storage area 223 which stores information used for performing processing, and a fiber channel interface 240 for communication with the storage system 20. The management information storage area 223 may be stored in the memory 230.

The command interface 222 includes an Admin queue 226 for receiving a command given chiefly at the time of initialization (or function for generation (or activation) of I/O issue queue, for example) or at the time of errors, a host processor I/O queue 227 (hereinafter referred to as processor queue) for receiving an I/O command from the host CPU 100, and an FPGA I/O issue queue 228 (hereinafter referred to as FPGA queue) for receiving an I/O command from the FPGA 200 of the accelerator 140. The processor queue 227 and the FPGA queue 228 are hereinafter each collectively referred to as I/O issue queue.

These I/O issue queues are combined with a management register of the HBA 130 and the like, and mapped in an address space (memory mapped input/output (MMIO) space) of a PCIe network as the command interface 222.

Each of the Admin queue 226, the processor queue 227, and the FPGA queue 228 is an independent queue to each of which a different address is allocated. The respective addresses of the Admin queue 226, processor queue 227, and FPGA queue 228 are allocated within the command interface 222 of a memory device in the address space of the PCIe network. An operating system (OS) 502, an HBA driver 503, or an FPGA driver 504 operating in the server 10 can be allocated to the address space of the PCIe network.

When the host CPU 100 or the FPGA 200 of the server 10 issues an I/O command by using one of the I/O issue queues, the processor 221 of the HBA 130 having received this I/O command performs an I/O command process such as write and read.

In the HBA 130 at a start of power, the I/O issue queues are not activated, but only the Admin queue 226 is activated. The host CPU 100 issues a command for generating (or activating) the I/O issue queues (or command for initialization) to the Admin queue 226. The processor 221 having received this command activates the processor queue 227, for example.

Thereafter, the processor 221 transmits notification about generation (or activation) of the processor queue 227 to the host CPU 100 of the server 10. Based on this notification, the host CPU 100 is allowed to use the processor queue 227.

Activation of the I/O issue queues 227 and 228 using the Admin queue 226 in this manner is herein referred to as generation of the I/O issue queues. A plurality of the I/O issue queues are prepared for the HBA 130. Information indicating activation or invalidation of the I/O issue queues is stored in a management information storage area of the protocol processing unit 220 (e.g., volatile memory medium such as dynamic random access memory (DRAM), and non-volatile memory medium such as flash memory, resistive random access memory (ReRAM), and phase change memory (PCM)) 223.

The Admin queue 226 functions as an initial setting interface to receive a command of initialization from the host CPU 100, and generate (activate) and manage the I/O issue queues 227 and 228. Each of the I/O issue queues 227 and 228 functions as an I/O issue interface which receives I/O commands from the host CPU 100 and the FPGA 200.

The HBA 130 in FIG. 3 has three I/O issue queues 227 to 229. In this case, the processor queue 227 is allocated to the host CPU 100 and activated, while the FPGA queue 228 is allocated to the FPGA 200 and activated. The I/O issue queue 229 is invalidated.

The invalidated I/O issue queue 229 can be allocated to other processors or the accelerator 141. For example, in case of the host CPU 100 constituted by a dual-core processor, one of cores of the processor may be allocated to the processor queue 227, while the other core may be allocated to the I/O issue queue 229. In this case, the respective cores can issue I/O without a necessity of mutual exclusion between the cores. Alternatively, the FPGA queue 228 may be allocated to the FPGA 200, while the I/O issue queue 229 may be allocated to an FPGA 510 (FPGA within accelerator 141, not shown). In this case, an I/O command can be issued from a plurality of FPGAs to the one HBA 130.

While the HBA 130 has three I/O issue queues in FIG. 3, the number of I/O issue queues may be any number as well as three.

The memory 230 stores data read from the storage system 20, the device allocation table 211 illustrated in FIG. 5, and an LU management table 232. The device allocation table 211 is similar to the foregoing device allocation table 211 retained by the accelerator 140.

FIG. 6 is a diagram illustrating an example of the LU management table 232. The LU management table 232 is created by the server 10 beforehand, and set for the HBA 130.

The LU management table 232 has columns 2320 provided in correspondence with the number of HBAs included in the storage system 20, and rows 2321 provided in correspondence with the number of LUs. Allocation information "1" or "0" is set for each identifier of the HBAs and for each identifier of the LUs. In this case, "1" indicates an LU allocated to an HBA, while "0" indicates a state of no allocation.

The protocol processing unit 220 of the HBA 130 can determine an access target LU for each of the HBAs 130 to 133 with reference to the LU management table 232.

<Configuration of Server>

FIG. 4 is a block diagram illustrating an example of software loaded to the main memory 110 of the server 10. The OS 502, the FPGA driver 504 controlling the accelerator 140, the HBA driver 503 controlling the HBA 130, and a database management system (DBMS) 501 managing the databases 500 are loaded to the main memory 110 of the server 10, and executed by the host CPU 100. The DBMS 501 function as a database arithmetic unit.

The HBA driver 503 and the FPGA driver 504 may be included in the OS 502. When accessing a device connected to the PCIe bus 153, the DBMS 501 accesses this device via the HBA driver 503 or the FPGA driver 504.

In the main memory 110, accesses are managed by the OS 502 based on allocation of memory elements of the main memory 110 to the address space. In NVMe and SCSI, however, each storage area of the databases 500 is managed in units of block. In this case, accesses are implemented by exchange of commands without allocation of all the blocks of the databases 500 to the address space (logical blocks) of the main memory 110.

When receiving a search (filtering process) request from a not-shown client computer, the DBMS 501 issues a search command from the FPGA driver 504 to the accelerator 140 as data indicating an NVMe command, and off-loads the filtering process to the accelerator 140.

On the other hand, when receiving a request of a process other than search (filtering process) or other processes off-loaded to the accelerator from a not-shown client computer, the DBMS 501 causes the host CPU 100 to perform this requested process, and issues an SCSI command from the HBA driver 503 to the HBA 130 to execute the request other than an off-load process.

Accordingly, the DBMS 501 off-loads, to the accelerator 140, an access request described in SQL statement or the like and including a searching process such as a filtering process and an aggregating process, and issues, to the HBA 130, an SCSI command for performing a process such as writing or deletion to and from the databases to execute this process.

Figure 8:
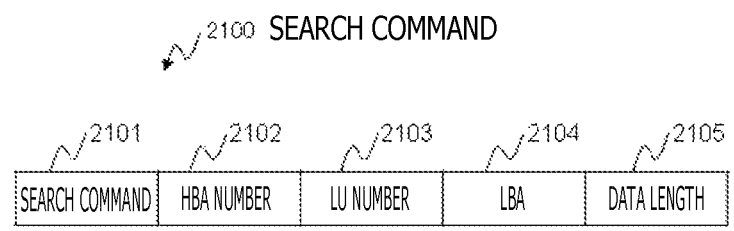
FIG. 8 is a diagram illustrating the first embodiment of the present invention, showing an example of a search command issued from the server.

FIG. 8 is a diagram illustrating an example of a search command 2100 issued from the DBMS 501 of the server 10. The search command 2100 includes a search command 2101 which stores a search target and a search condition in SQL statement or the like, an HBA number 2102 which stores an identifier of the HBA 130 used for a searching process, an LU number 2103 which stores an identifier of one of the LUs 600 to 630 to be accessed, an LBA 2104 which stores an address of an access target, and a data length 2105 which stores a data length of the access target.

The accelerator 140 having received the search command 2100 requests the designated HBA 130 to read, and acquires from the storage system 20, data corresponding to a searching process target designated by the LU number 2103, the LBA 2104, and the data length 2105 to execute a filtering process.

The respective function units of the OS 502, the DBMS 501, the FPGA driver 504, and the HBA driver 503 illustrated in FIG. 4 are loaded to the main memory 110 as programs.

The host CPU 100 performs processing under the programs of the respective function units to operate as a function unit for providing predetermined functions. The main memory 110 stores a database management program as one of data processing programs. For example, the host CPU 100 performs processing under the database management program to function as the DBMS 501. This applies to other programs. In addition, the host CPU 100 also functions as a function unit for providing respective functions of a plurality of processes executed under the respective programs. A computer and a computing system are a device and a system each including these function units.

Information such as programs and tables implementing respective functions of the DBMS 501 can be stored in the storage system 20, a memory device such as a non-volatile semiconductor memory, hard disk drive, and solid state drive (SSD), or a non-transitory data memory medium readable by a computer, such as an integrated circuit (IC) card, secure digital (SD) card, and digital versatile disk (DVD).

<Initialization Process>

Figure 7:
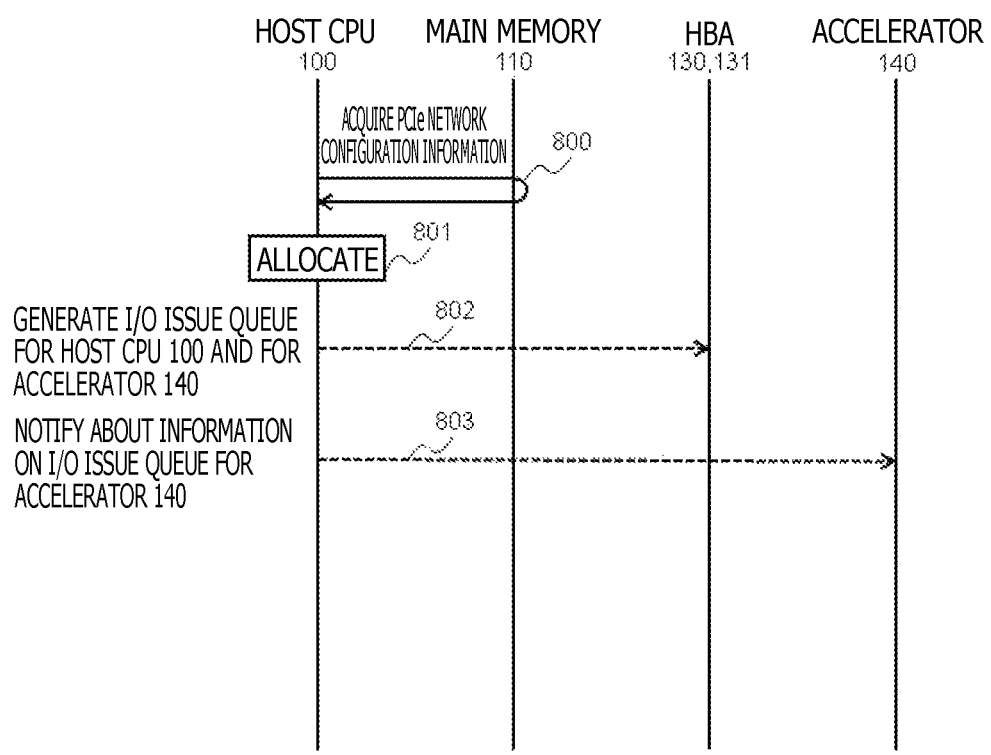
FIG. 7 is a sequence diagram illustrating the first embodiment of the present invention, showing an example of an initialization process performed by the computing system.

FIG. 7 is a sequence diagram illustrating an example of an initialization process performed by the server 10.

At the time of a start of initialization by the server 10, the host CPU 10 acquires, from the main memory 110, configuration information indicating the PCIe network to which the host CPU 100 is connected (800). The initialization process according to the present embodiment is executed by the OS 502, the HBA driver 503, and the FPGA driver 504 loaded to the main memory 110. It is assumed in the following description that the host CPU 100 is a center element for performing processes executed at the OS 502, the HBA driver 503, or the FPGA driver 504.

In the PCIe network, the chip set 150 including the PCIe route complex 160 detects a network configuration of a PCIe end point device connected to the chip set 150 at a startup, and stores a detection result (e.g., PCI device tree) in a predetermined area of the main memory 110.

The host CPU 100 can acquire the stored configuration information indicating the PCIe network (or bus) by accessing the predetermined area of the main memory 110. The configuration information indicating the PCIe network may include a position of a device on the network (or bus), performance of the device, a capacity of the device, or others.

Subsequently, the host CPU 100 allocates the accelerator 140 which accesses the HBAs 130 and 131 based on the acquired configuration information indicating the PCIe network (801). Information used for allocation may be read from the device allocation table 211 illustrated in FIG. 5 and adopted, for example. The accelerator 141 and the HBAs 132 and 133 perform processing not-shown but similar to the processing illustrated in FIG. 7.

Allocation of the HBA 130 and the accelerator 140 is not limited to allocation with one-to-one correspondence. For example, the host CPU 100 may allocate both the accelerator 140 and the accelerator 141 to the HBA 130, or may allocate the accelerator 140 to both the HBA 130 and the HBA 131.

Subsequently, the host CPU 100 transmits an instruction for generating an I/O issue queue to the HBAs 130 and 131 (802). The host CPU 100 connected to the PCIe route complex 160 herein can acquire an address of the Admin queue 226 retained by each of the protocol processing units 220 of the HBAs 130 and 131. On the other hand, the accelerator 140 corresponding to the PCIe end point is unable to acquire the address of the Admin queue 226 which also corresponds to the PCIe end point.

Accordingly, the host CPU 100 generates, by using the Admin queue 226 of the HBA 130, two queues, i.e., the processor queue 227 for allowing the host CPU 100 to issue an I/O command to the HBAs 130 and 131, and the FPGA queue 228 for allowing the accelerator 140 to issue an I/O command to the HBA 130 (802).

Subsequently, the host CPU 100 notifies the accelerator 140 about queue information concerning the FPGA queue 228 (address of FPGA queue 228 and maximum number of simultaneous issue commands (queue depth)) (803).

When at least the address and queue depth of the FPGA queue 228 are known in this manner, the accelerator 140 can issue an I/O command to the HBAs 130 and 131. Moreover, queue information may contain an address of a PCIe (or PCI) configuration resistor (not shown) of each of the HBAs 130 and 131, an accessible range of logical block address (LBA) (e.g., accessible head LBA and capacity), and others.

For example, when the accelerator 140 can acquire the address of the PCIe configuration resistor of the HBA 130, the accelerator 140 can also acquire an address of an SCSI register of the HBA 130. The accelerator 140 can calculate an accessible LBA range based on these addresses. When the plurality of HBAs 130 and 131 are allocated to the one accelerator 140, for example, the accelerator 140 can determine to which of the memory devices the accelerator 140 should issue an I/O command based on the accessible LBA range.

By the foregoing process illustrated in FIG. 7, the FPGA 200 of the accelerator 140 connected as the end point of the PCIe network can acquire queue information concerning the FPGA queue 228 from the host CPU 100. In this case, the accelerator 140 corresponding to the PICe end point can issue an I/O command to the HBA 130 also corresponding to the PCIe end point. Accordingly, the accelerator 140 is allowed to access the database 500 of the storage system 20 connected to the HBA 130.

According to the procedures of the example described herein, the host CPU 100 generates the processor queue 227 and the FPGA queue 228 by using the Admin queue 226. However, the accelerator 140 may generate the processor queue 227 and the FPGA queue 228 based on notification about an address of the Admin queue 226 given from the host CPU 100 to the accelerator 140.

<Outline of I/O Issue Process>

Figure 9:
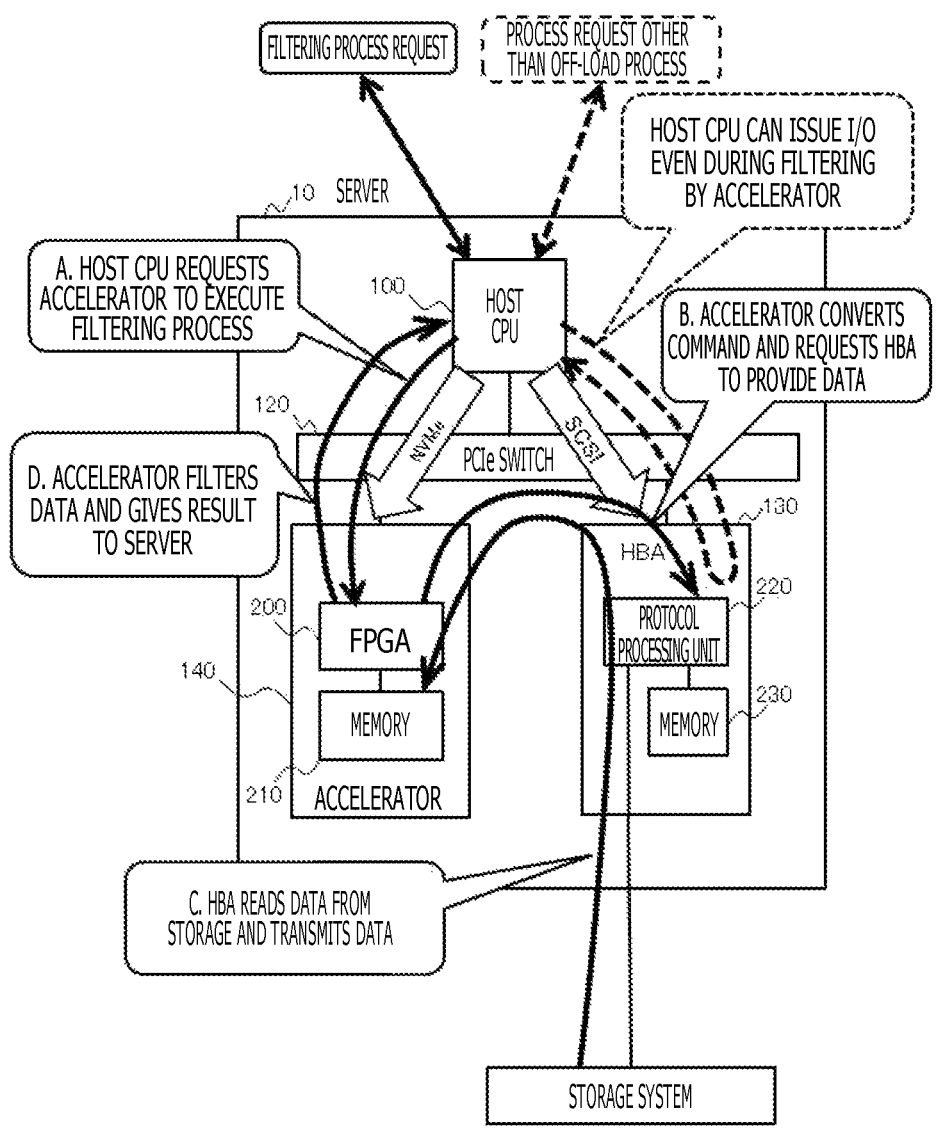
FIG. 9 is an explanatory diagram illustrating the first embodiment of the present invention, showing an I/O issue process performed by the server.

FIG. 9 is an explanatory diagram illustrating a case where the server 10 performs an I/O issue process. When receiving a searching process (filtering process) request, the server 10 performs a process in a route indicated by a solid line in the figure. When receiving a request of a process other than an off-load process such as searching process (filtering), the server performs a process in a route indicated by a broken line in the figure.

An outline of the process performed in response to reception of a searching process request is initially described. When receiving a searching process request, the DBMS 501 of the server 10 generates the search command 2100 illustrated in FIG. 8, and off-loads a searching process to the accelerator 140.

The FPGA 200 of the accelerator 140 converts data corresponding to a processing target and contained in the search command 2100 of an NVMe command received from the server 10 into an SCSI command, and requests the HBA 130 to acquire data corresponding to a search target. The HBA 130 acquires the designated data from the database 500 of the storage system 20 based on the request converted into the SCSI command, and writes the acquired data to the memory 210 of the accelerator 140.

For writing to the memory 210 of the accelerator 140, the HBA 130 is notified about a predetermined address in the memory 210 as a response destination address by using the SCSI command converted by the FPGA 200.

Subsequently, the filtering circuit 202 of the FPGA 200 performs a filtering process for the data acquired by the HBA 130. Thereafter, the aggregation circuit 203 performs a predetermined aggregating process for an arithmetic result obtained by the filtering circuit 202, stores an aggregated result in the memory 210, and then notifies the I/O processing circuit 201 about completion of the searching process.

Finally, the I/O processing circuit 201 writes a result of the searching process to the main memory 110 of the server 10 from the memory 210 to complete the filtering process request.

On the other hand, when receiving a request of a process other than an off-load process such as a filtering process, the DBMS 501 of the server 10 generates an SCSI command, and requests the HBA 130 to perform processing. Thereafter, a response to the SCSI command requesting the HBA 130 is transmitted to the server 10 to end processing.

According to the first embodiment, the processor queue 227 for receiving an I/O command from the server 10, and the FPGA queue 228 for receiving an I/O command from the accelerator 140 are independently set for the command interface 222 of the HBA 130. Accordingly, the HBA 130 is allowed to receive an SCSI command requesting a filtering process and converted from an NVMe command received from the accelerator 140, and an SCSI command requesting other processing and received from the server 10 in parallel to each other.

<Details of Searching Process>

Figure 10:
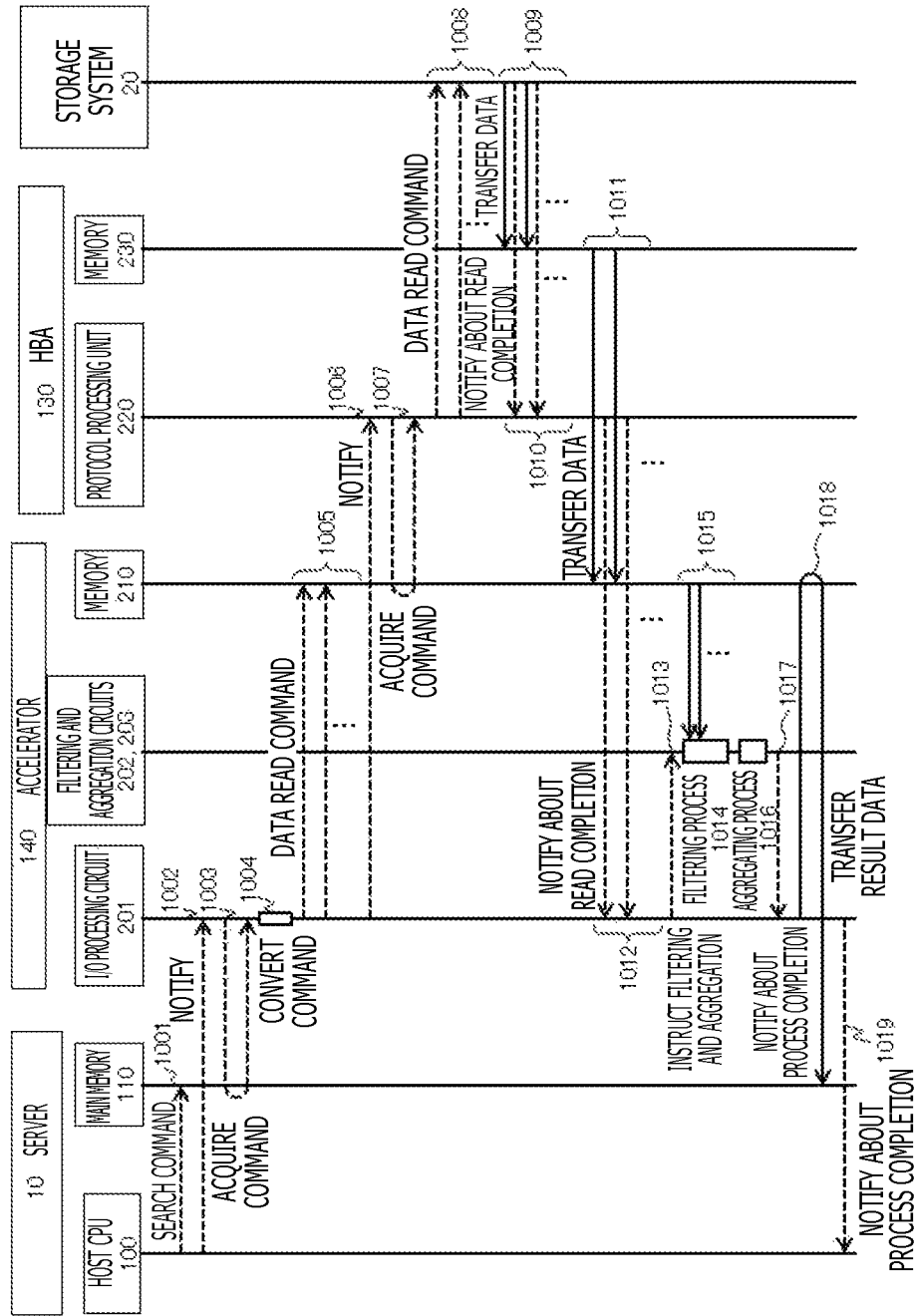
FIG. 10 is a sequence diagram illustrating the first embodiment of the present invention, showing a case where the server off-loads a searching process to the accelerator.

FIG. 10 is a sequence diagram of a process performed in a case where the server 10 off-loads a searching process to the accelerator. As illustrated in FIG. 9, the DBMS 501 of the server 10 having received a searching process request off-loads processing to the accelerator 140. Described hereinbelow are details of a process performed by the computing system in this case.

When the server 10 receives a searching process request, the host CPU 100 executing the DBMS 501 generates the search command 2100 illustrated in FIG. 8, and writes the search command 2100 to the main memory 110 (1001). Subsequently, the host CPU 100 notifies the accelerator 140 about issue of the search command 2100 (1002).

In the accelerator 140 having received the notification, the I/O processing circuit 201 acquires the search command 2100 from a predetermined address of the main memory 110 (1003). The command conversion unit 205 of the I/O processing circuit 201 extracts whereabouts of data corresponding to a processing target (HBA number 2102, LU number 2103, LBA number 2104, and data length 2105) from the search command 2100 of NVMe protocol, and converts the extracted whereabouts into a read command of SCSI (1004). Well-known or widely known technologies may be adopted for conversion of commands between different interfaces (or protocols). This conversion is therefore not detailed herein.

The command conversion unit 205 of the I/O processing circuit 201 stores the converted read command in the memory 210 (1005). The I/O processing circuit 201 notifies the HBA 130 designated by the HBA number 2102 about issue of the read command (1006).

The protocol processing unit 220 of the HBA 130 having received the notification about the issue of the read command converted into the SCSI command acquires a read command from the memory 210 of the accelerator 140 having received the notification (1007).

The protocol processing unit 220 issues, via the fiber channel interface 240, a read command to the corresponding one of the LUs 600 to 630 designated by the LU number 2103 and included in the storage system 20 (1008). The read command is issued for each predetermined read size (e.g., 128 KB).

The storage system 20 having received the read command reads data from the designated database 500, and writes the data to the memory 230 of the HBA 130 (1009). After completion of one read command, the storage system 20 notifies the protocol processing unit 220 about completion of the one read (1010).

After all data requested by the read command is written to the memory 230, the protocol processing unit 220 of the HBA 130 transfers the data and writes the data to the memory 210 of the accelerator 140 (1011). Data is transferred for each predetermined read size (e.g., 128 KB). The protocol processing unit 220 transmits read completion notification to the I/O processing circuit 201 every time transfer of one item of data is completed (1012).

After all the data designated by the read command is written to the memory 210, the I/O processing circuit 201 instructs the filtering circuit 202 and the aggregation circuit 203 to execute the search command 2101 (1013). The filtering circuit 202 executes the search command 2101 for the data in the memory 210, and stores a filtering process result in the memory 210 (1014, 1015). The aggregation circuit 203 executes an aggregating process designated in the search command 2100 for the filtering process result in the memory 210, stores an aggregated result in the memory 210 (1016), and notifies the I/O processing circuit 201 about completion of processing (1017).

When receiving the completion notification, the I/O processing circuit 201 reads a searching process result from the memory 210, and transfers the searching process result to the main memory 110 of the server 10 (1018). After completion of the data transfer, the I/O processing circuit 201 notifies the server 10 about completion of processing of the search command 2100, and ends processing (1019).

By the foregoing process, the search command 2100 of NVMe issued by the DBMS 501 of the server 10 is converted into an SCSI command at the command conversion unit 205 of the accelerator 140, and given to the HBA 130 as notification. Based on this notification, the HBA 130 is allowed to read data from the storage system 20, and transfer the data between devices of different interfaces at PCIe end points.

<Details of Process Other than Searching Process>

Figure 11:
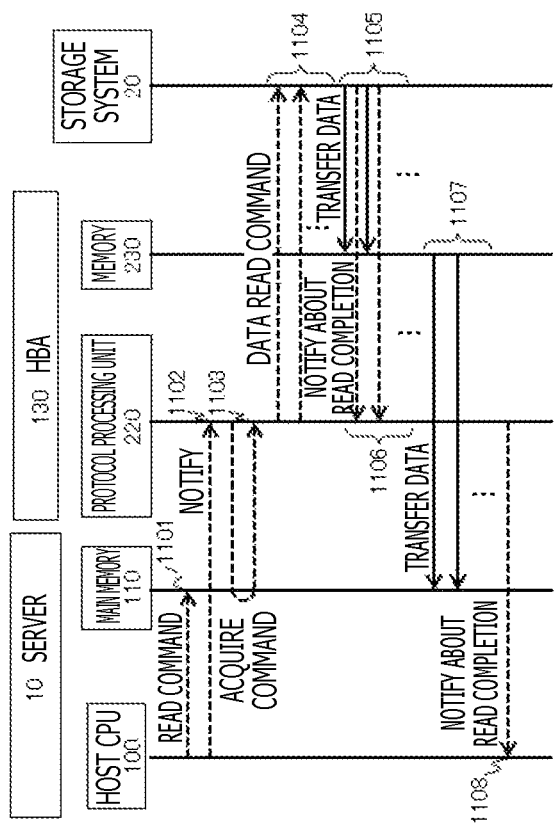
FIG. 11 is a sequence diagram illustrating the first embodiment of the present invention, showing a case where the server issues an I/O of a process other than search.

FIG. 11 is a sequence diagram illustrating a process performed in a case where the server 10 executes a process other than an off-load process such as search (filtering). As illustrated in FIG. 9, the DBMS 501 of the server 10 having received a request for other than an off-load process such as a searching process issues an SCSI command directly to the HBA 130, and executes processing. Described hereinbelow are details of a process performed by the computing system in this case. Presented herein is an example in which the DBMS 501 of the server 10 issues a read command for simply reading data. Insertion, update, and deletion of data (record), and operation of a table are performed by similar processing.

When the server 10 receives a reading process request, the host CPU 100 executing the DBMS 501 generates a read command as an SCSI command, and writes the read command to the main memory 110 (1101). Subsequently, the host CPU 100 notifies the protocol processing unit 220 of the HBA 130 about issue of the SCSI command (1102).

The protocol processing unit 220 of the HBA 130 having received the notification about issue of the SCSI command acquires a read command from the main memory 110 of the server 10 (1103).

The protocol processing unit 220 issues a read command to the corresponding one of the LUs 600 to 630 designated by the LU number 2103 in the storage system 20 via the fiber channel interface 240 similarly to steps 1008 to 1009 described above with reference to FIG. 10. The storage system 20 reads data retained in the designated database 500, and writes the data to the memory 230 of the HBA 130 (1104, 1105). After completion of one read command, the storage system 20 notifies the protocol processing unit 220 about completion of the one read (1106).

After all data requested by the read command is written to the memory 230, the protocol processing unit 220 of the HBA 130 transfers the data and writes the data to the main memory 110 (1107). After completion of transfer of all data, the protocol processing unit 220 transmits read completion notification to the host CPU 100 of the server 10 (1108).

According to the processing described above, the server 10 having received a request for a process other than an off-load process such as a filtering process issues a predetermined command to the HBA 130 without using the accelerator 140, and ends processing.

According to the first embodiment, the HBA 130 includes the I/O interface (FPGA queue 228) for receiving an I/O command (search command) from the accelerator 140 at the PCIe end point, and the I/O interface (processor queue 227) for receiving an I/O command from the server 10 in such a condition that these I/O interfaces are independent from each other. Accordingly, an I/O command from the accelerator 140, and an I/O command from the server 10 are allowed to be received in parallel to each other.

According to the first embodiment, as described above, a command received by the accelerator 140 based on NVMe protocol is converted into an SCSI command of protocol for communicating with the storage system 20 when the HBA 130 is requested to provide data. Accordingly, high-speed filtering process and aggregating process are achievable by access to data retained in the database 500 stored in the storage system 20 via the SAN 300.

In other words, according to the first embodiment, data transfer between the PCIe end points is achievable. In this case, the server 10 need not access the storage system 20 and transfer processing target data to the accelerator 140. Accordingly, a processing load applied to the server 10 also decreases.

When the storage system 20 has a function of copying the databases 500 or producing and storing backup, redundancy of the databases 500 increases.

Described in the first embodiment is an example which adopts NVMe as protocol (first protocol) for issuing the search command 2100 to the accelerator 140 from the DBMS 501. However, this protocol may be other well-known or widely known protocols.

Described in the first embodiment is an example which adopts SCSI as a protocol (second protocol) for issuing a command to the storage system 20 from the HBA 130. However, this protocol may be other well-known or widely known protocols.

According to the first embodiment, a part of the database process included in the program, which is a database management program executed by the servers 10 and 11 (e.g., filtering and aggregating processes), is off-loaded to the accelerator 140. However, a part of a data processing program which reads and processes data stored in the storage system 20, such as a general-purpose program for machine leaning or deep learning, or a program described by a user, such as a statistical processing program described in Python or R language, may be off-loaded to the accelerator.

According to the first embodiment, the accelerator 140 specifies a logical unit of the storage system 20 and reads data directly from the logical unit. Accordingly, the accelerator can achieve high-speed processing of a part of a process performed by a processor while eliminating bottle neck produced by data transfer between the host processor and the main memory in the conventional example.

Second Embodiment

Figure 12:
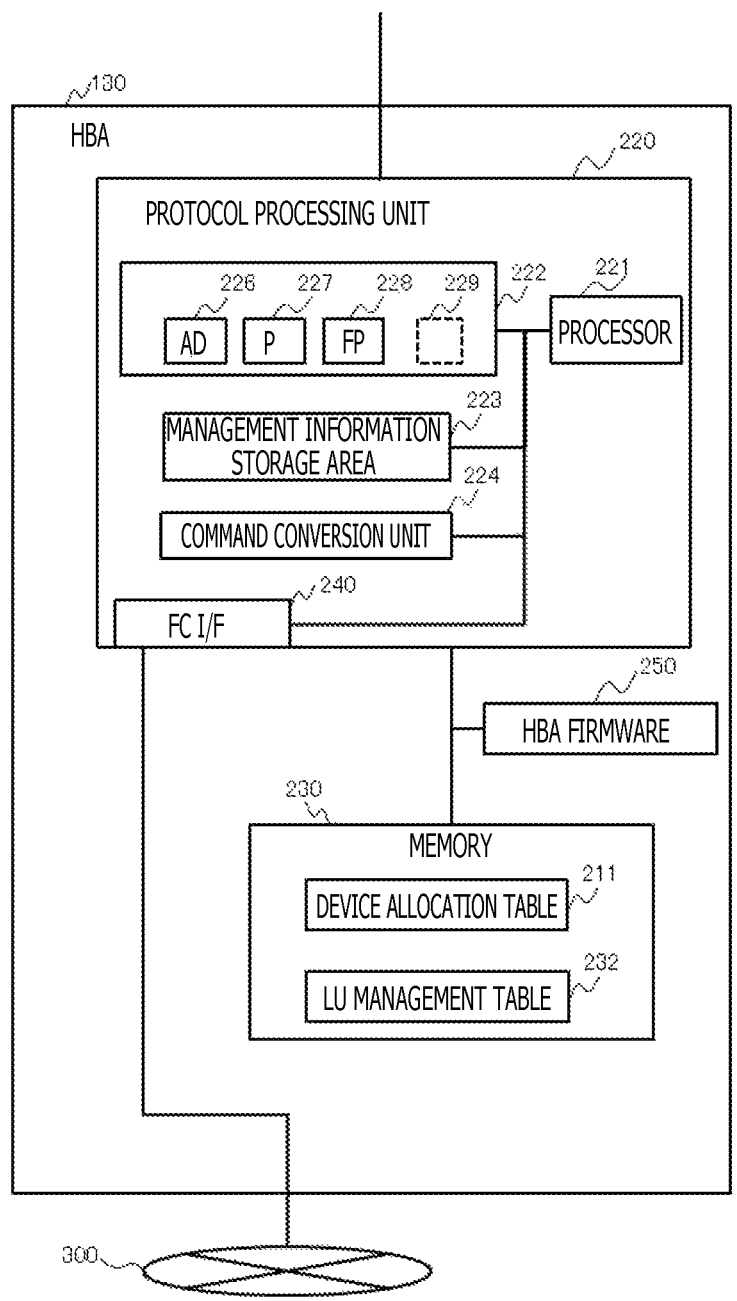
FIG. 12 is a block diagram illustrating a second embodiment of the present invention, showing an example of an HBA.

FIG. 12 is a block diagram illustrating a second embodiment of the present invention, showing an example of the HBA 130. Described in the first embodiment is an example which converts an NVMe command into an SCSI command at the command conversion unit 205 of the accelerator 140. However, an example presented in the second embodiment achieves conversion at the protocol processing unit 220 of the HBA 130.

A configuration similar to the configuration of the first embodiment is adopted except that a command conversion unit 224 is added to the protocol processing unit 220 of the HBA 130. The command conversion unit 224, which is equivalent to the command conversion unit 205 of the I/O processing circuit 201 in the first embodiment, converts an NVMe command into an SCSI command.

Figure 13:
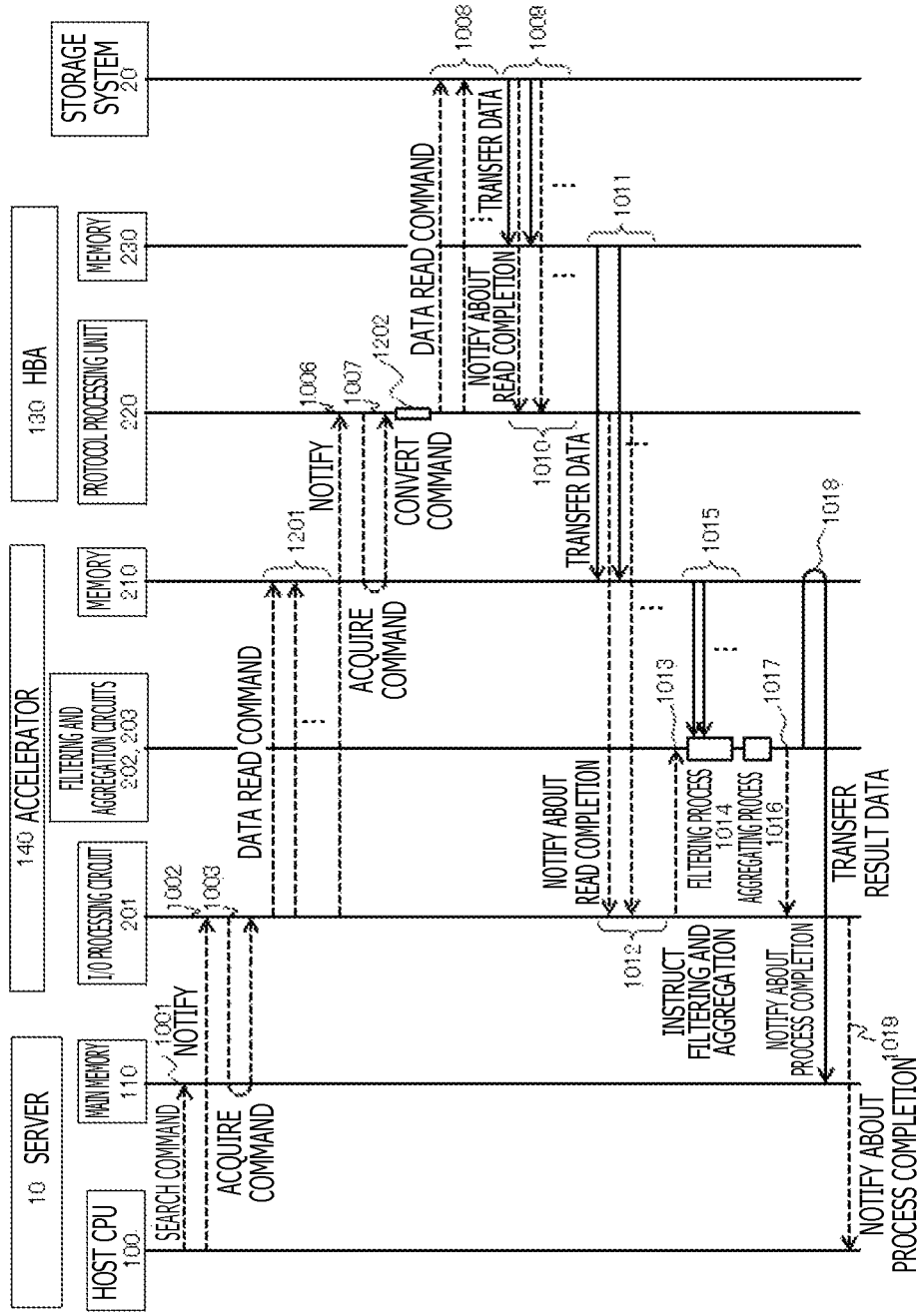
FIG. 13 is a sequence diagram illustrating the second embodiment of the present invention, showing a case where a server off-loads a searching process to an accelerator.

FIG. 13 is a sequence diagram illustrating a case where the server 10 off-loads a searching process to the accelerator 140. According to the second embodiment, step 1004 and step 1005 in the first embodiment illustrated in FIG. 10 are replaced with step 1202 and step 1201, respectively. Other configurations are similar to the corresponding configurations of the first embodiment.

Steps 1001 to 1003 are similar to the corresponding steps in the first embodiment illustrated in FIG. 10. In subsequent step 1201, the I/O processing circuit 201 of the accelerator 140 generates a read command as an NVMe command for reading data designated by the LU number 2103, LBA 2104, and data length 2105 to give the read command to the HBA 130 having the HBA number 2102 designated by the search command 2100, and writes the generated read command to the memory 210.

The I/O processing circuit 201 notifies the protocol processing unit 220 of the designated HBA 130 about issue of the read command (1006). The protocol processing unit 220 acquires the NVMe read command from the memory 210 of the accelerator 140 (1007). Thereafter, the command conversion unit 224 in the protocol processing unit 220 of the HBA 130 converts the NVMe read command into an SCSI read command (1202).

Subsequently, the protocol processing unit 220 issues the SCSI read command to the storage system 20 (1008). Step 1008 and steps after step 1008 are similar to the corresponding steps in the first embodiment. When the HBA 130 writes data to the memory 210 of the accelerator 140 from the storage system 20, the FPGA 200 of the accelerator 140 performs filtering and aggregating processes.

Similarly to the first embodiment, the HBA 130 in the second embodiment converts an NVMe command into an SCSI command, acquires data from the storage system 20, and transfers the data to the accelerator 140. Accordingly, the accelerator 140 can acquire data retained in the databases 500 stored in the storage system 20, and execute filtering and aggregating processes at a high speed.

In the second embodiment which converts a command of NVMe protocol into a command of SCSI protocol at the protocol processing unit 220 of the HBA 130, the command conversion unit 205 of the FPGA 200 may be eliminated.

Third Embodiment

Figure 14:
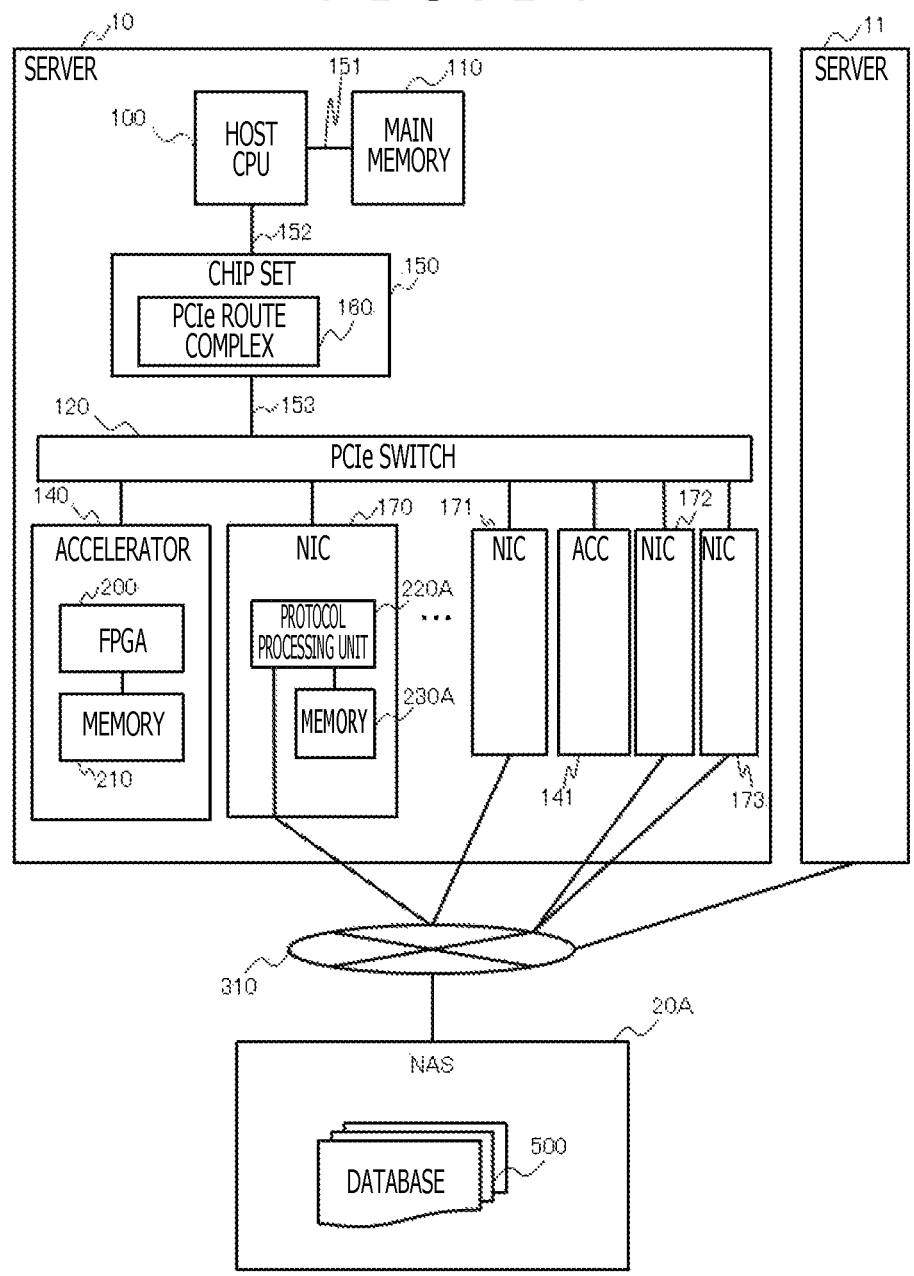
FIG. 14 is a block diagram illustrating a third embodiment of the present invention, showing an example of a computing system.

FIG. 14 is a block diagram illustrating a third embodiment of the present invention, showing an example of a computing system. The third embodiment shows an example which stores the databases 500 in a network attached storage (NAS) 20A accessible on a file basis (in units of file), instead of the storage system 20 accessible on a block basis.

Figure 15:
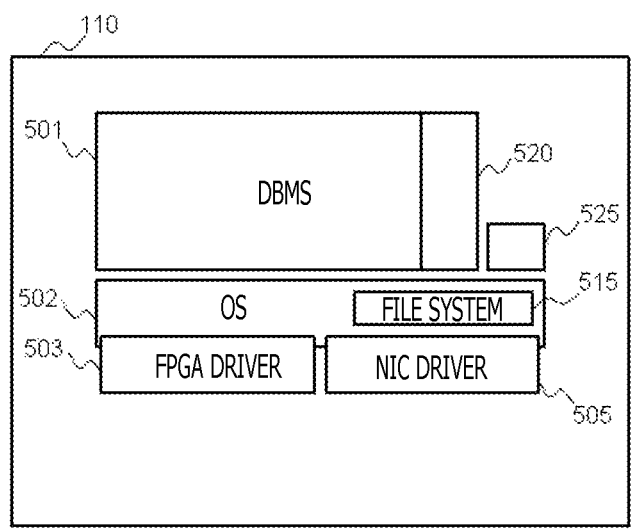
FIG. 15 is a block diagram illustrating the third embodiment of the present invention, showing an example of software loaded to a memory of a server.

Accordingly, in the example presented herein, the SAN 300 in the first embodiment is replaced with an IP network 310, and the HBAs 130 to 133 in the first embodiment are replaced with network interface cards (NICs) 170 to 173. Concerning the server 10, as illustrated in FIG. 15, a file system 515 is added to the OS 502 of the first embodiment, a library 520 is added to the DBMS 501, and an LBA acquisition unit 525 operates on the OS 502. The server 11 has a similar configuration.

As illustrated in FIG. 14, the NIC 170 includes a protocol processing unit 220A which receives an access request from the server 10 or the accelerator 140 and issues an access command for accessing the NAS 20A, and a memory 230A which stores data read from the NAS 20A. Each of the NICs 171 to 173 has a similar configuration. The protocol processing unit 220A includes a network interface (not shown) which communicates with the NAS 20A via the IP network 310.

FIG. 15 is a block diagram illustrating an example of software loaded to the main memory 110 of the server 10.

Differences from the first embodiment lie in a configuration for acquiring correspondence between LBAs of the NAS 20A and file names to access the NAS 20A corresponding to a file-based storage system, and a configuration for accessing the IP network 310.

More specifically, an NIC driver 505 which controls the NIC 170 in place of the HBA driver 503 of the first embodiment is loaded to the main memory 110. The LBA acquisition unit 525 operating on the OS 502 is added to the main memory 110 in the configuration of the first embodiment. The file system 515 which achieves conversion between block-based access and file-based access is added to the OS 502. The library 520 which stores LBAs associated with file names is added to the DBMS 501.

The FPGA 200 of the accelerator 140 accesses the memory 210 on a block basis. Accordingly, the DBMS 501 acquires correspondence between file names and LBAs.

Figure 16:
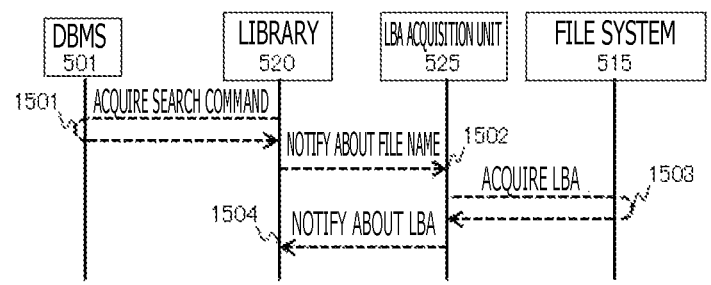
FIG. 16 is a sequence diagram illustrating the third embodiment of the present invention, showing an example of a process performed by the server.

FIG. 16 is a sequence diagram illustrating an example of an LBA acquisition process performed by the server 10. When the DBMS 501 receives a searching process request, the library 520 acquires a file name of a search target from the searching process request (1501), and notifies the LBA acquisition unit 525 about the file name (1502).

The LBA acquisition unit 525 inquires the file system 515 about the acquired file name, and acquires an LBA corresponding to the file name (1503). The LBA acquisition unit 525 notifies the library 520 of the DBMS 501 about the LBA corresponding to the file name.

The DBMS 501 generates the search command 2100 of the first embodiment illustrated in FIG. 8 from the LBA corresponding to the file name stored in the library 520. According to the third embodiment, an identifier of the NIC 170 can be stored in the HBA number 2102 of the search command 2100. When a logical unit number (LUN) of internet small computer system interface (iSCSI) is set for the NAS 20A, this LUN may be stored in the LU number 2103. When the NAS 20A does not have an LUN, a volume identifier or the like may be used. According to the third embodiment, a file name may be added to the search command 2100 so that the accelerator 140 can send a request to the NIC 170 by using the file name.

When receiving the search command 2100 as NVMe command, the accelerator 140 converts the received search command 2100 into a file-based access request given to the NIC 170, and executes a filtering process similarly to the first embodiment.

In this manner, the accelerator 140 converts an NVMe command into a file-based access request, and requests the NIC 170 to provide data similarly to the first embodiment even when the storage system connected to the server 10 is the NAS 20A accessible on a file basis. Accordingly, high-speed filtering and aggregating processes can be executed by access to the databases 500 stored in the NAS 20A via the IP network 310.

As described above, the command conversion unit 205 of the accelerator 140 can convert an NVMe command in accordance with protocol (or interface) used by an I/O device accessing the storage system.

Accordingly, the accelerator 140 can write data retained in the databases 500 stored in the storage system directly to the memory 210 as a local memory, and perform filtering and aggregating processes at a high speed by using the FPGA 200.

Moreover, by changing the command conversion unit 205 of the accelerator 140, protocols for accessing storage systems, i.e., a variety of types of protocols for communicating with NAS or SAN storages, can be handled.

Fourth Embodiment

Figure 17:
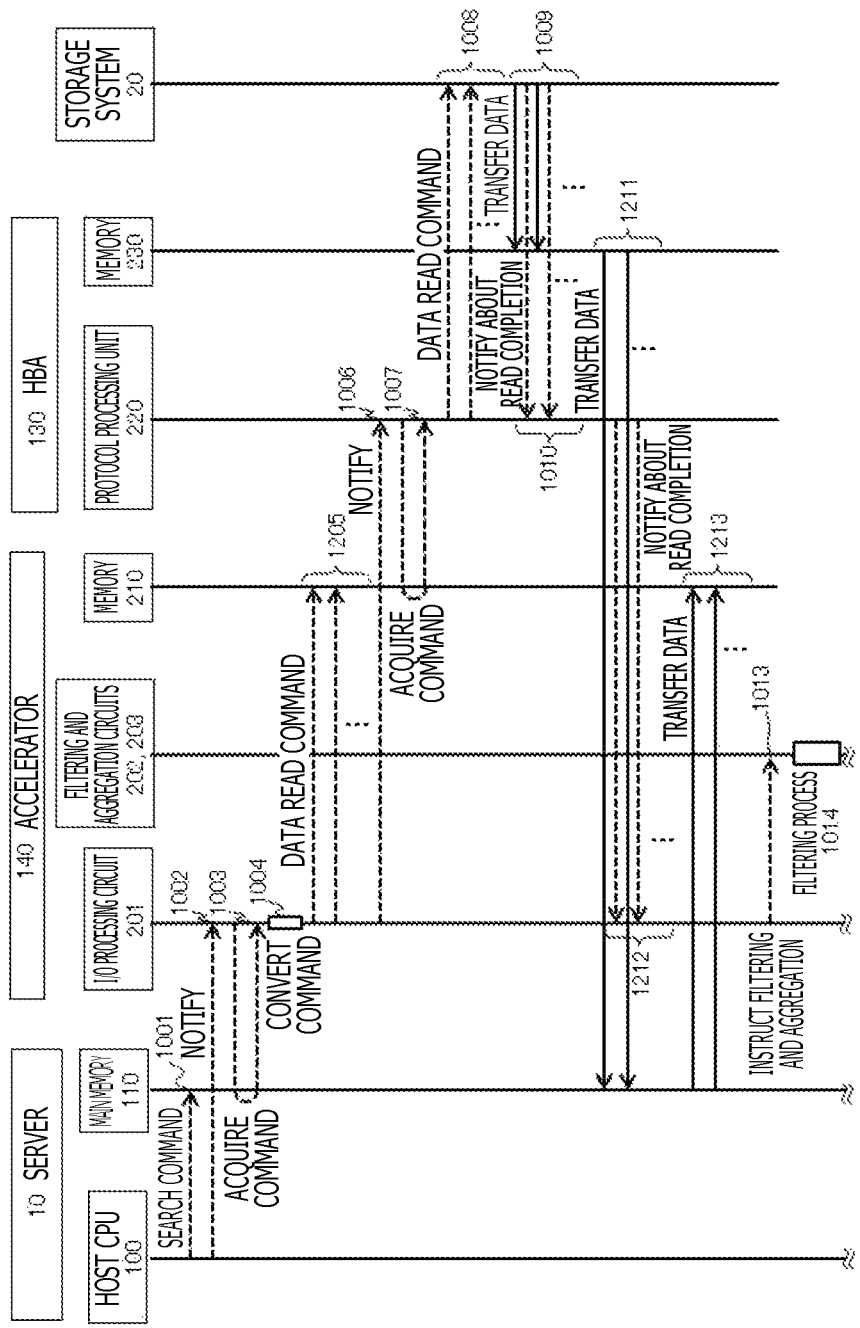
FIG. 17 is a sequence diagram illustrating a fourth embodiment of the present invention, showing a case where a server off-loads a searching process to an accelerator.

FIG. 17 is a sequence diagram illustrating a fourth embodiment of the present invention, showing a case where the server 10 off-loads a searching process to the accelerator 140.

According to a process presented in the fourth embodiment, the server 10 off-loads a searching process to the accelerator 140 in case of a specification that the HBA 130 illustrated in FIG. 1 writes data read in response to a read command only to the main memory 110 of the server 10.

According to the first embodiment, the HBA 130 reads data from the storage system 20 in response to a read command from the accelerator 140, writes the data to the memory 210 of the accelerator 140 corresponding to a device at the PCIe end point, and ends processing as illustrated in FIG. 10.

On the other hand, when the HBA 130 transfers data read from the storage system 20 only to the main memory 110, and is not allowed to transfer the data to a device at the PCIe end point, a process illustrated in FIG. 17 is executed.

Steps 1001 to 1010 in FIG. 17 are similar to the corresponding steps in the first embodiment illustrated in FIG. 10. The accelerator 140 converts the search command 2100 of NVMe command into an SCSI command, and instructs the HBA 130 to process the read command. Subsequently, the HBA 130 writes data read from the storage system 20 to the memory 230. The protocol processing unit 220 receives read completion notification from the storage system 20 (1009, 1010).

When data corresponding to the read command arrives at the memory 230, the protocol processing unit 220 writes the data in the memory 230 to a predetermined area (MMIO) of the main memory 110 (1211). The protocol processing unit 220 issues read completion notification to the I/O processing circuit 201 of the accelerator 140 for each predetermined transfer size (e.g., 128 KB) (1212).

After arrival of read completion notification for all read commands instructed to the HBA 130, the I/O processing circuit 201 of the accelerator 140 transfers data read by the HBA 130 from the main memory 110 of the server 10 to the memory 210 as a local memory (1213).

After completion of data transfer from the main memory 110 of the server 10, the I/O processing circuit 201 of the accelerator 140 instructs the filtering circuit 202 and the aggregation circuit 203 to execute the search command 2100 (1013).

Subsequent steps are similar to step 1014 and steps after step 1014 in the first embodiment illustrated in FIG. 10, and therefore are not repeatedly shown in the figure.

As described above, the accelerator 140 can receive read completion notification from the HBA 130, and acquire data read by the HBA 130 from the main memory 110 of the server 10 even when the HBA 130 has a specification not allowed to transfer data to a device at the PCIe end point. Accordingly, off-loading of a searching process to the accelerator 140 is achievable regardless of the specification of the HBA 130.

Fifth Embodiment

Figure 18:
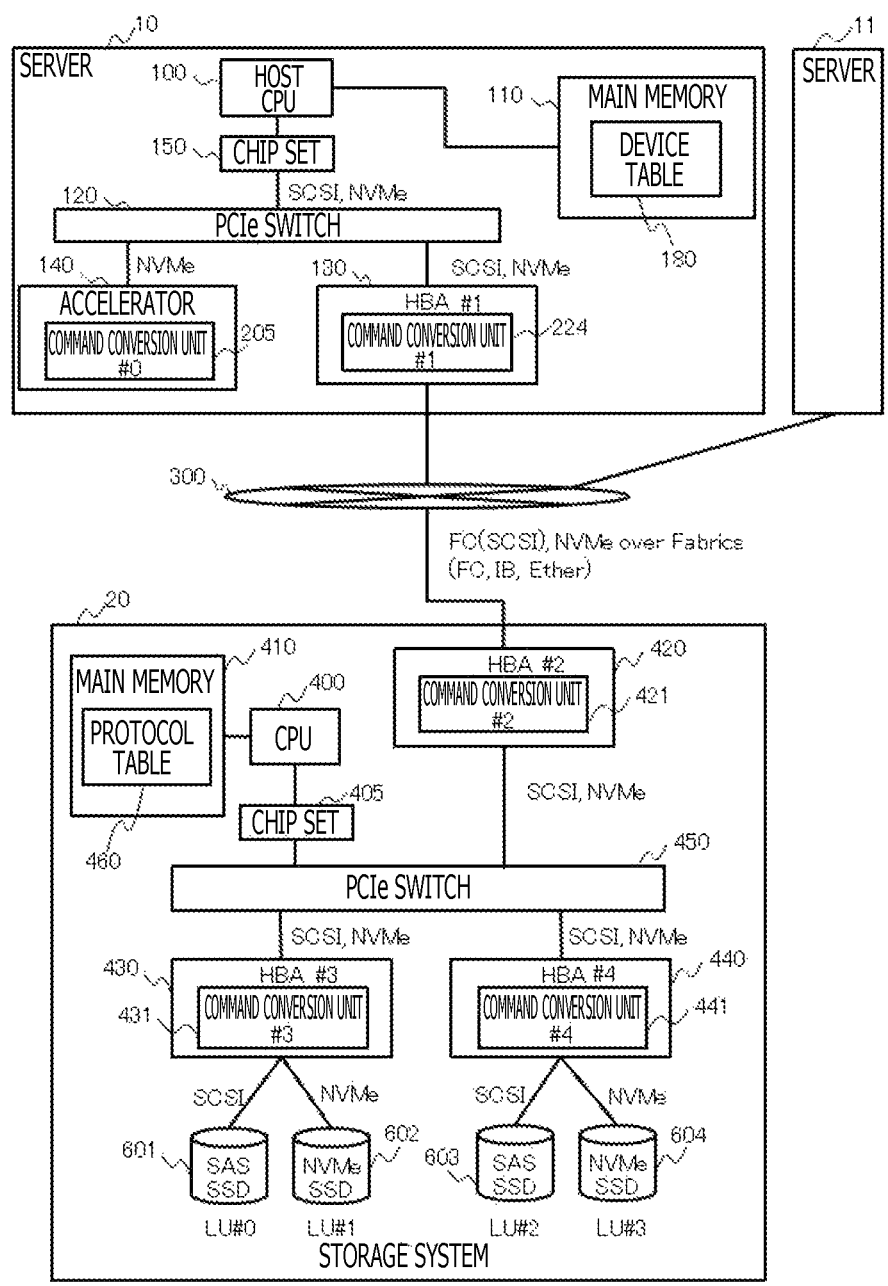
FIG. 18 is a block diagram illustrating a fifth embodiment of the present invention, showing an example of a computing system.

FIG. 18 is a block diagram illustrating a fifth embodiment of the present invention, showing an example of a computing system. According to the examples described in the first to fourth embodiments, the HBAs 130 to 133 communicate with the SAN 300 based on SCSI protocol. However, an example described in the fifth embodiment is a case where the SAN 300 can communicate based on NVMe Over Fabrics of NVMe protocol as well as SCSI. The SAN 300 may be constituted by any one of Fibre Channel (FC), Infinity Band (IB), and Ethernet.

According to the example presented in the fifth embodiment, the accelerator 140 and the HBA 130 (#1) of the server 10 include the command conversion unit 205 and the command conversion unit 224, respectively, while each of HBAs of the storage system 20 similarly includes a command conversion unit. According to the example presented in the fifth embodiment, the host CPU 100 of the server 10 selects a device which converts commands based on an LU to be accessed.

The command conversion unit 205 of the accelerator 140 is similar to the command conversion unit 205 in the first embodiment, while the command conversion unit 224 of the HBA 130 is similar to the command conversion unit 224 in the second embodiment. The main memory 110 of the server 10 stores a device table 180 described below, in addition to the software of the first embodiment illustrated in FIG. 4. Other configurations are similar to the corresponding configurations of the first and second embodiments.

The storage system 20 includes a main memory 410 connected to a CPU 400, a chip set 405 connected to the CPU 400 and including a not-shown PCIe route complex, a PCIe switch 450 connected to the chip set 405, HBAs 420, 430, and 440 connected to the PCIe switch 450, LUs 601 and 602 connected to the HBA 430, and LUs 603 and 604 connected to the HBA 440.

Each of LUs 601 and 603 is an SSD having a specification of serial attached SCSI (SAS) and receiving an SCSI command, while each of LUs 602 and 604 is an SSD receiving an NVMe command. According to the example described in the fifth embodiment, an SSD is used as a non-volatile memory medium. However, a hard disk drive (HDD) or the like may be adopted as a non-volatile memory medium. The main memory 410 stores a protocol table 460 described below.

The HBAs of the storage system 20 are constituted by an HBA 420 connected to the SAN 300, an HBA 430 connected to LUs 601 and 602, and an HBA 440 connected to the LUs 603 and 604. The HBAs 420 to 440 are connected to the chip set 405 and the CPU 400 via the PCIe switch 450.

The HBAs 420, 430, and 440 include command conversion units 421, 431, and 441, respectively, within the protocol processing units similarly to the HBA 130 of the second embodiment. Each of the command conversion units 421, 431, and 441 is capable of converting an NVMe command into an SCSI command, and converting an SCSI command into an NVMe command.

The CPU 400 of the storage system 20 creates the protocol table 460 at a startup, and stores the protocol table 460 in the main memory 410.

In response to connection with the server 10, the storage system 20 transmits the protocol table 460 to the host CPU 100. The host CPU 100 of the server 10 creates the device table 180 based on the received protocol table 460, and stores the device table 180 in the main memory 110.

FIG. 20 is a diagram illustrating an example of the protocol table 460. The protocol table 460 includes entries each containing an LU #412 which stores an identifier of the corresponding one of the LUs 601 to 604, and a protocol 413 which stores a protocol receivable by the corresponding one of the LUs 601 to 604.

When receiving an access request from the server 10, the CPU 400 of the storage system 20 is allowed to acquire a protocol of an access target LU with reference to the protocol table 460, and output an instruction indicating a necessity of conversion to the command conversion units 421, 431, and 441 of the HBAs 420 to 440.

The command conversion unit performing conversion may be designated at the startup.

In the storage system 20, the chip set 405 including a PCIe route complex (not shown) detects a network configuration of a PCIe end point device connected to the chip set 405 at the startup, and stores a detection result (e.g., PCI device tree) in a predetermined area of the main memory 410.

The CPU 400 can acquire configuration information indicating the stored PCIe network (or bus) by accessing the predetermined area of the main memory 410. The configuration information indicating the PCIe network may include a position and type of a device on the network (or bus), performance and protocol of the device, a capacity of the device, or others.

The CPU 400 creates the protocol table 460 by acquiring identifiers and protocols of the LUs 601 to 604 from the configuration information indicating the PCIe network, and stores the protocol table 460 in a predetermined area of the main memory 410.

FIG. 19 is a diagram illustrating an example of the device table 180. The device table 180 includes entries each containing an LU #181 which stores an identifier of the corresponding one of the LUs 601 to 604, a protocol 182 which stores a protocol receivable by the corresponding one of the LUs 601 to 604, and a table 183 which stores a table name (or identifier) of the database stored in the corresponding LU.

When connected to the storage system 20, the DBMS 501 of the server 10 acquires data indicated in the protocol table 460, and gives a table identifier of the database stored in the corresponding one of the LUs 601 to 604 to create the device table 180.

The DBMS 501 of the server 10 having received the table name of the database can acquire the identifier of the LU and protocol corresponding to an access destination with reference to the device table 180.

Figure 21:
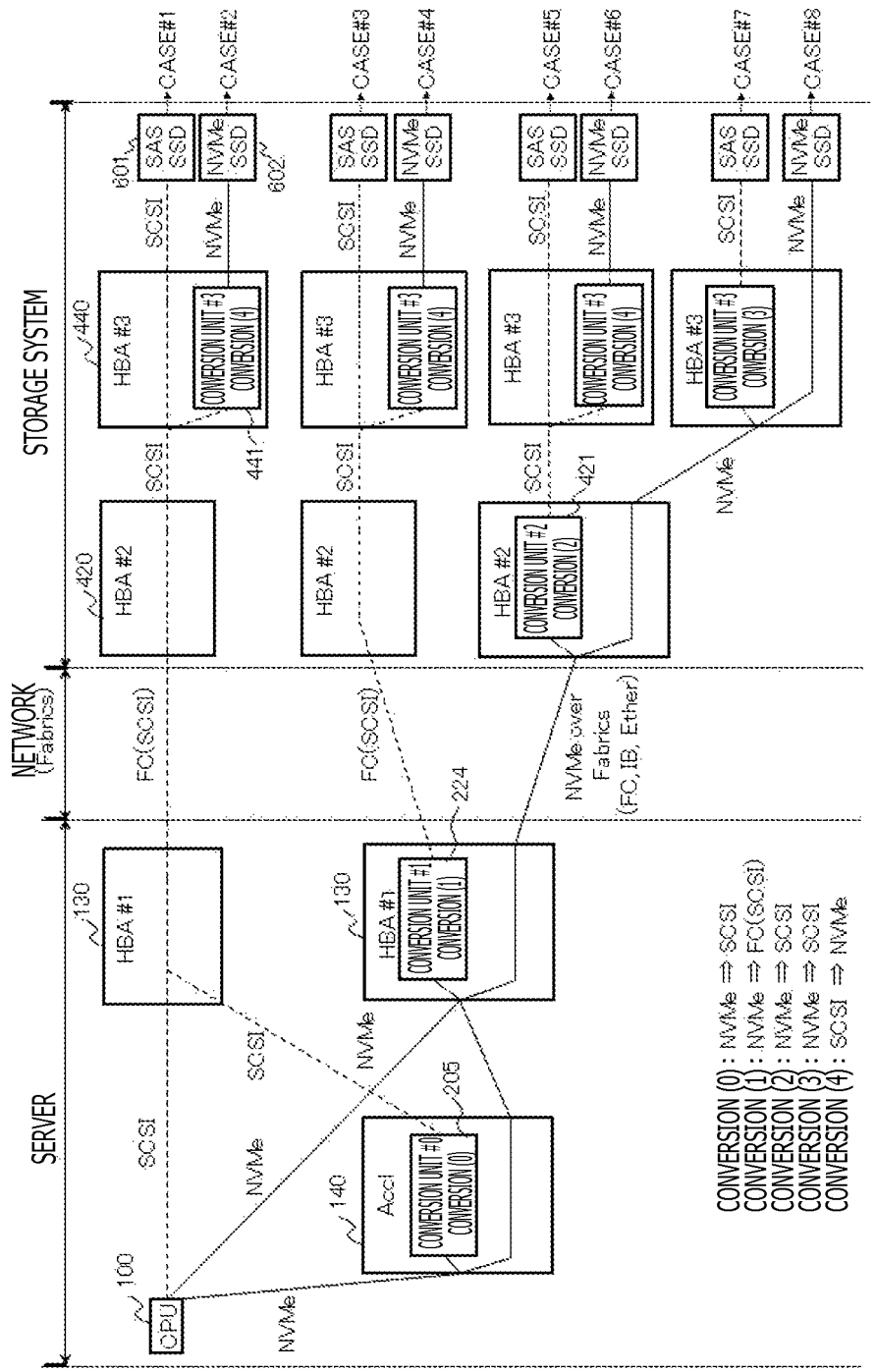
FIG. 21 is an explanatory diagram illustrating the fifth embodiment of the present invention, showing an example of conversion patterns performed by the computing system.

FIG. 21 is an explanatory diagram illustrating protocol conversion patterns performed by the computing system. When receiving an access request for accessing the database from a not-shown client computer, the server 10 distributes processes in accordance with contents of the access request.

More specifically, the DBMS 501 off-loads, to the accelerator 140, a search request described in SQL statement or the like and requesting a process such as filtering and aggregating processes, and issues, to the HBA 130, an SCSI command or an NVMe command for performing a process such as writing to the database or deletion to execute processing.

The DBMS 501 refers to the device table 180 based on the identifier of the database included in the access request, and acquires an LU and protocol of the access target. When the access request is described in SQL statement, the DBMS 501 issues an instruction as an NVMe command to the accelerator 140, and performs conversion in accordance with the protocol received by the LU of the access destination.

Protocol conversion performed by the computing system in the fifth embodiment is roughly divided into eight patterns of cases #1 to #8 shown in FIG. 21. The respective cases #1 to #8 are hereinafter described.

(1) Case #1

In case #1, protocol of input to the HBA 130 of the server 10 is SCSI protocol, protocol of an LU corresponding to an access target is also SCSI protocol, and protocol of the SAN 300 is also SCSI protocol. When the DBMS 501 off-loads a process to the accelerator 140, the command conversion unit 205 of the accelerator 140 converts an NVMe command into an SCSI command to give an instruction to the HBA 130 similarly to the first embodiment.

The HBA 130 transfers the command to the HBA 420 of the storage system 20 via the SAN 300 under SCSI protocol. The HBA 420 transfers the command of SCSI protocol to the HBA 440, and accesses the LU 601 of SAS at the end point. In this pattern, the accelerator 140 converts protocol when the DBMS 501 off-loads a process to the accelerator 140.

When the DBMS 501 issues an SCSI command, the HBA 130 and the HBAs 420 and 440 transfer the SCSI command to access the LU 601 at the end point similarly to the first embodiment.

(2) Case #2

In case #2, protocol of input to the HBA 130 of the server 10 is SCSI protocol, protocol of an LU corresponding to an access target is NVMe protocol, and protocol of the SAN 300 is SCSI protocol. When the DBMS 501 off-loads a process to the accelerator 140, the command conversion unit 205 of the accelerator 140 converts an NVMe command into an SCSI command to give an instruction to the HBA 130 similarly to the first embodiment.

The HBA 130 transfers the command to the HBA 420 of the storage system 20 via the SAN 300 under SCSI protocol. The HBA 420 transfers the command of SCSI protocol to the HBA 440. The command conversion unit 441 of the HBA 440 converts the SCSI command into an NVMe command to access the LU 602 of NVMe at the end point. In this pattern, the accelerator 140 converts protocol similarly to the first embodiment when the DBMS 501 off-loads a process to the accelerator 140.

When the DBMS 501 issues an SCSI command, the HBA 130 and the HBA 420 transfer the SCSI command. The command conversion unit 441 of the HBA 440 converts the SCSI command into an NVMe command to access the LU 602 of HVMe at the end point.

(3) Case #3

In case #3, protocol of input to the HBA 130 of the server 10 is NVMe protocol, protocol of an LU corresponding to an access target is SCSI protocol, and protocol of the SAN 300 is SCSI protocol. When the DBMS 501 off-loads a process to the accelerator 140, the accelerator 140 gives, to the HBA 130, an instruction for accessing the LU 601 as an NVMe command similarly to the second embodiment. The command conversion unit 224 of the HBA 130 converts the NVMe command into an SCSI command, and transmits the SCSI command to the HBA 420 of the storage system 20 via the SAN 300.

The HBA 420 transfers the command of SCSI protocol to the HBA 440, and accesses the LU 601 of SAS at the end point.

When the DBMS 501 issues an NVMe command, the command conversion unit 224 of the HBA 130 converts the NVMe command into an SCSI command similarly to the second embodiment. The HBAs 420 and 440 transfer the SCSI command and access the LU 601 at the end point.

(4) Case #4

In case #4, protocol of input to the HBA 130 of the server 10 is NVMe protocol, protocol of an LU corresponding to an access target is also NVMe protocol, and protocol of the SAN 300 is SCSI protocol. When the DBMS 501 off-loads a process to the accelerator 140, the accelerator 140 gives, to the HBA 130, an instruction for accessing the LU 602 as an NVMe command similarly to the second embodiment. The command conversion unit 224 of the HBA 130 converts the NVMe command into an SCSI command, and transmits the SCSI command to the HBA 420 of the storage system 20 via the SAN 300.

The HBA 420 transfers the command of SCSI protocol to the HBA 440. The command conversion unit 441 of the HBA 440 converts the SCSI command into an NVMe command to access the LU 602 of NVMe at the end point.

When the DBMS 501 issues an NVMe command, the command conversion unit 224 of the HBA 130 converts the NVMe command into an SCSI command similarly to the second embodiment. The HBA 420 transfers the SCSI command. The command conversion unit 441 of the HBA 440 converts the SCSI command into an NVMe command to access the LU 602 of NVMe at the end point similarly to the above case.

(5) Case #5

In case #5, protocol of input to the HBA 130 of the server 10 is NVMe protocol, protocol of an LU corresponding to an access target is SCSI protocol, and protocol of the SAN 300 is NVMe protocol. When the DBMS 501 off-loads a process to the accelerator 140, the accelerator 140 gives, to the HBA 130, an instruction for accessing the LU 601 as an NVMe command similarly to the second embodiment. The HBA 130 transmits the NVMe command without change, and transfers the NVMe command to the HBA 420 of the storage system 20 via the SAN 300.

The command conversion unit 421 converts the NVMe command into an SCSI command. The HBA 420 subsequently transfers the SCSI command to the HBA 440 to access the LU 601 of SAS at the end point.

When the DBMS 501 issues an NVMe command, the HBA 130 transmits the NVMe command without change to the storage system 20 similarly to the above case. The HBA 420 converts the NVMe command into an SCSI command to access the LU 601 of SAS at the end point.

(6) Case #6

In case #6, protocol of input to the HBA 130 of the server 10 is NVMe protocol, protocol of an LU corresponding to an access target is NVMe protocol, and protocol of the SAN 300 is NVMe protocol. When the DBMS 501 off-loads a process to the accelerator 140, the accelerator 140 gives, to the HBA 130, an instruction for accessing the LU 601 as an NVMe command similarly to the second embodiment. The HBA 130 transmits the NVMe command without change, and transfers the NVMe command to the HBA 420 of the storage system 20 via the SAN 300.

The command conversion unit 421 of the HBA 420 converts the NVMe command into an SCSI command. The HBA 420 subsequently transfers the SCSI command to the HBA 440. The command conversion unit 441 of the HBA 440 converts the SCSI command into an NVMe command to access the LU 602 of NVMe at the end point.

When the DBMS 501 issues an NVMe command, the HBA 130 transmits the NVMe command without change to the storage system 20 similarly to the above case. The HBA 440 converts the NVMe command into an SCSI command. The command conversion unit 441 of the HBA 440 further converts the SCSI command into an NVMe command to access the LU 602 of NVMe at the end point.

(7) Case #7

In case #7, protocol of input to the HBA 130 of the server 10 is NVMe protocol, protocol of an LU corresponding to an access target is SCSI protocol, and protocol of the SAN 300 is NVMe protocol. When the DBMS 501 off-loads a process to the accelerator 140, the accelerator 140 gives, to the HBA 130, an instruction for accessing the LU 601 as an NVMe command similarly to the second embodiment. The HBA 130 transmits the NVMe command without change, and transfers the NVMe command to the HBA 420 of the storage system 20 via the SAN 300.

The HBA 420 transfers the NVMe command to the HBA 440. The command conversion unit 441 of the HBA 440 converts the NVMe command into an SCSI command to access the LU 601 of SAS at the end point based on the SCSI command.

When the DBMS 501 issues an NVMe command, the HBA 130 transmits the NVMe command without change to the storage system 20 similarly to the above case. The HBA 440 converts the NVMe command into an SCSI command to access the LU 601 of SAS at the end point.

(8) Case #8

In case #8, protocol of input to the HBA 130 of the server 10 is NVMe protocol, protocol of an LU corresponding to an access target is NVMe protocol, and protocol of the SAN 300 is NVMe protocol. When the DBMS 501 off-loads a process to the accelerator 140, the accelerator 140 gives, to the HBA 130, an instruction for accessing the LU 601 as an NVMe command similarly to the second embodiment. The HBA 130 transmits the NVMe command without change, and transfers the NVMe command to the HBA 420 of the storage system 20 via the SAN 300.

The HBA 420 transfers the NVMe command to the HBA 440. The HBA 440 accesses the LU 602 of NVMe at the end point based on the not converted NVMe command.

When the DBMS 501 issues an NVMe command, the HBA 130 transmits the NVMe command without change to the storage system 20 similarly to the above case. The HBA 440 accesses the LU 602 of NVMe at the end point based on the not-converted NVMe command.

According to the fifth embodiment described above, an SCSI command and an NVMe command are transferred via the SAN 300, and converted into commands of protocols corresponding to protocols of the LUs 601 to 604 at the end points. In this case, data can be read from the accelerator 140 by adopting the LUs 601 to 604 of desired protocols. Accordingly, a large volume of data can be processed at a high speed without limitation to the type of protocols.

For construction of the computing system, a position of protocol conversion inside a server or a storage system may be determined as an item of specifications of the computing system, based on factors of HBAs or device specifications to be used, and system performance.

SUMMARY

As described in the respective embodiments, the conversion unit for converting commands in accordance with protocols is only required at least in either the accelerator 140 or the HBA 130. The plurality of accelerators 140 and 141 may be so configured as to execute different processes.

The present invention is not limited to the embodiments described herein, but may include various modifications. For example, the embodiments herein are described in detail only for easy understanding of the present invention, wherefore all constituent elements included in the configuration discussed herein are not necessarily required. A part of the configuration of any one of the embodiments may be replaced with the configuration of a different one of the embodiments, and the configuration of any one of the embodiments may be added to the configuration of a different one of the embodiments. Any changes, i.e., addition of a different configuration to a part of the configuration of any one of the embodiments, and deletion and replacement of a part of the configuration of any one of the embodiments may be made individually or in combination with each other.

A part or all of the respective configurations, functions, processing units, processing means and the like described herein may be implemented by hardware provided by designing integrated circuits, for example. Alternatively, the configurations, functions and the like described herein may be implemented by software by using a processor which interprets and executes programs implementing the respective functions. Information such as programs, tables, and files for implementing the respective functions may be included in a recording device such as a memory, hard disk, and solid state drive (SSD), or a recording medium such as an IC card, SD card, and DVD.

Control lines and information lines shown herein are only lines considered to be necessary for description, and do not necessarily show all control lines and information lines necessary for a product. In practical situations, substantially all the configurations may be considered to be connected to each other.

The invention claimed is:

1. A computing system comprising:
 a computer that includes a processor and a first memory, and executes a data processing program; and
 a storage device that is connected to the computer via a network, and stores data processed under the data processing program, wherein:
 the computer includes
  a protocol processing unit that is connected to the network, and accesses data stored in the storage device, and
  an accelerator that includes an arithmetic unit connected to the processor and executing a part of a process of the data processing program, and a second memory storing data, and executes the part of the process of the data processing program;

the first memory stores a data processing program that receives a processing request for processing the data, and causes the accelerator to execute a data processing command corresponding to the processing request in a case where the processing request includes a process to be executed by the arithmetic unit, or issues, to the protocol processing unit, a data processing command corresponding to the processing request in a case where the processing request does not include a process to be executed by the arithmetic unit; and the accelerator requests the protocol processing unit to provide target data indicated by a data processing command received from the data processing program, reads the data from the storage device via the protocol processing unit, and stores the data in the second memory, and subsequently the arithmetic unit that executes the part of the process of the data processing program executes the data processing command, wherein the protocol processing unit includes a first queue that receives a command from the processor, and a second queue that receives a data processing command from the accelerator, in such a condition that the first queue and the second queue are independent from each other, and wherein:
the accelerator converts a data processing command received from the data processing program based on a first protocol into a command of a second protocol, and transmits the converted data processing command to the protocol processing unit; and
the protocol processing unit reads, from the storage device, target data indicated by the converted data processing command of the second protocol, and responds to the accelerator.

2. The computing system according to claim 1, wherein:
the data processing program is a database management program;
the data stored in the storage device is a database; and
the part of the process executed by the arithmetic unit is a searching process.

3. The computing system according to claim 1, wherein the first protocol stores a data processing command in the first memory, and causes an issue destination of the data processing command to read the data processing command stored in the first memory.

4. The computing system according to claim 3, wherein the first protocol is non-volatile memory express (NVMe) protocol.

5. The computing system according to claim 1, wherein the second protocol is a protocol for communicating with the storage device.

6. The computing system according to claim 5, wherein the second protocol is a protocol for accessing the storage device in units of block.

7. The computing system according to claim 5, wherein the second protocol is a protocol for accessing the storage device in units of file.

8. The computing system according to claim 1, wherein the accelerator executes a process designated by the data processing command for the target data read by the protocol processing unit, and transfers a result of the process to the first memory.

9. The computing system according to claim 1, wherein the protocol processing unit includes a conversion unit that converts a data processing command received from the data processing program based on a first protocol into a command of the second protocol.

10. The computing system according to claim 9, wherein the storage device includes a conversion unit that converts the first protocol into the second protocol, and converts the second protocol into the first protocol.

11. A server that includes a processor and a first memory, and executes a data processing program, wherein:
the server includes
a protocol processing unit that accesses data, and
an accelerator that includes an arithmetic unit connected to the processor and executing a part of a process of the data processing program, and a second memory storing data, and executes the part of the process of the data processing program;

the first memory stores a data processing program that receives a processing request for processing the data, and causes the accelerator to execute a data processing command corresponding to the processing request in a case where the processing request includes a process to be executed by the arithmetic unit, or issues, to the protocol processing unit, a data processing command corresponding to the processing request in a case where the processing request does not include a process to be executed by the arithmetic unit; and the accelerator requests the protocol processing unit to provide target data indicated by a data processing command received from the data processing program, reads the data via the protocol processing unit, and stores the data in the second memory, and subsequently the arithmetic unit that executes the part of the process of the data processing program executes the data processing command;

wherein the protocol processing unit includes a first queue that receives a command from the processor, and a second queue that receives a data processing command from the accelerator, in such a condition that the first queue and the second queue are independent from each other, and wherein:
the accelerator converts a data processing command received from the data processing program based on a first protocol into a command of a second protocol, and transmits the converted data processing command to the protocol processing unit; and
the protocol processing unit reads, from the storage device, target data indicated by the converted data processing command of the second protocol, and responds to the accelerator.

12. The server according to claim 11, wherein:
the data processing program is a database management program;
the data is a database; and
the part of the process executed by the arithmetic unit is a searching process.

13. The server according to claim 11, wherein the first protocol stores a data processing command in the first memory, and causes an issue destination of the data processing command to read the data processing command stored in the first memory.

14. The server according to claim 11, wherein the first protocol is non-volatile memory express (NVMe) protocol.

15. The server according to claim 11, wherein
the second protocol is a protocol for communication between the protocol processing unit and an outside.

16. The server according to claim 11, wherein
the accelerator executes a process designated by the data processing command for the target data read by the protocol processing unit, and transfers a result of the process to the first memory.

* * * * *